(12) United States Patent
Sueoka et al.

(10) Patent No.: US 7,537,721 B2
(45) Date of Patent: May 26, 2009

(54) METHOD OF MANUFACTURING BOOT FOR CONSTANT-VELOCITY UNIVERSAL JOINT AND MANUFACTURING APPARATUS FOR USE IN THE METHOD, AND BOOT FOR CONSTANT VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama-Ken (JP)

( * ) Notice: Subject to any disclaimer, the term of this patent is extended or adjusted under 35 U.S.C. 154(b) by 0 days.

(21) Appl. No.: 10/920,315

(22) Filed: Aug. 18, 2004

(65) Prior Publication Data

US 2005/0046077 A1   Mar. 3, 2005

(30) Foreign Application Priority Data

Sep. 2, 2003  (JP) .............................. 2003-310523
Apr. 27, 2004  (JP) .............................. 2004-131959

(51) Int. Cl.
*B29C 45/14*  (2006.01)
(52) U.S. Cl. .................. 264/328.12; 264/255; 264/259; 264/250
(58) Field of Classification Search ................. 264/255
See application file for complete search history.

(56) References Cited

U.S. PATENT DOCUMENTS

| 4,013,748 A | * | 3/1977 | Valyi ........................... 264/513 |
| 4,856,795 A | * | 8/1989 | DeLano et al. .............. 277/635 |
| 5,529,538 A | | 6/1996 | Schulz et al. |
| 5,900,205 A | * | 5/1999 | Sadr et al. .................... 264/531 |
| 6,099,785 A | * | 8/2000 | Schweigert et al. ....... 264/328.1 |
| 6,402,999 B1 | * | 6/2002 | Sadr et al. ..................... 264/68 |

FOREIGN PATENT DOCUMENTS

| JP | 2-22 -463 | 2/1990 |
| JP | 2002-286048 | 10/2002 |
| JP | 2003-041317 | 2/2003 |

\* cited by examiner

*Primary Examiner*—Monica A Huson
(74) *Attorney, Agent, or Firm*—Rader, Fishman & Grauer PLLC

(57) ABSTRACT

There is disclosed a boot for a constant-velocity universal joint, in which a secondary molded portion including a thick portion is formed in a large-diameter side end portion of a primary molded member, and the boot is easily pulled out of a core mold. The boot is downsized and lightened to reduce costs. A manufacturing method includes: a step of forming a secondary molding space 43 between an inner peripheral surface of a large-diameter side end portion 3 of the primary molded member and an outer peripheral surface of a core mold 69; a step of injecting a molten material into the secondary molding space to mold the secondary molded portion; and a step of integrally molding a secondary molded member on the inner peripheral surface of the large-diameter side end portion of the primary molded member to form a boot 1, moving a removable portion 83 of a second mold section 79 of the core mold 69 which abuts on at least the end portion of the thick portion in the vicinity of the bellows portion in a central axial direction of the core mold to remove the removable portion from an undercut portion 17a of a thick portion 17 just before separating the boot from the core mold, and separating the core mold 69 from the boot 1 in this state.

6 Claims, 19 Drawing Sheets

METHOD OF MANUFACTURING BOOT FOR CONSTANT-VELOCITY UNIVERSAL JOINT AND MANUFACTURING APPARATUS FOR USE IN THE METHOD, AND BOOT FOR CONSTANT VELOCITY UNIVERSAL JOINT

BACKGROUND OF THE INVENTION

1. Field of the Invention

The present invention relates to a boot for a constant-velocity universal joint, including a large-diameter side end portion attached to an outer peripheral surface of a tripod joint whose outer peripheral surface is formed to be concave and in which a plurality of axial-direction grooves are formed among constant-velocity universal joints for use, for example, in driving shafts for transmitting powers to hubs to which tires are attached from differential gears connected to engines of cars.

2. Description of the Related Art

Constant-velocity universal joints are used, for example, in opposite end portions of a driving shaft for a car. Moreover, a flexible boot is attached to cover a bent portion of the constant-velocity universal joint in order to seal grease for lubricating the constant-velocity universal joint and to prevent invasion of foreign matters such as dust and water from the outside. A large-diameter side end portion and a small-diameter side end portion of the boot are usually fastened to the outer peripheral surface of a casing of the constant-velocity universal joint on a differential gear side or a hub side and the outer peripheral surface of a shaft portion of the driving shaft by bands to fix the boot.

Moreover, in the constant-velocity universal joint on the differential side (inboard side), a tripod joint is generally used in which, for example, three sets of rollers attached to the shaft portion of the driving shaft in a trifurcate state are constituted to be slidable in an axial direction. In the outer peripheral surface of the casing of the tripod joint, groove-like concave portions extending in the axial direction in the outer peripheral surface are formed, for example, in three places scattered in a peripheral direction for thinning and lightening of the joint. In this case, in the inner peripheral surface of the large-diameter side end portion of the boot for the constant-velocity universal joint, a thick portion is formed in a circularly protruded shape as viewed in the axial direction in accordance with the surface of the concave portion (see U.S. Pat. No. 5,529,538, for example).

In the boot for the constant-velocity universal joint, which has heretofore been used in the tripod joint, for example, it is known that bellows are formed of resin, for example, by injection blow molding, and an annular grommet including a thick portion protruding in an inner-diameter direction is fitted into the inner peripheral surface along which the inner diameter of the large-diameter side end portion of the resin bellows is formed to be constant (see U.S. Pat. No. 5,529,538, for example).

In the boot for the constant-velocity universal joint, the casing of the tripod joint is inserted into an inner periphery of the grommet, and an outer periphery of the casing of the tripod joint is fastened by a fastening tool such as a band from an outer peripheral side of the large-diameter side end portion to attach the boot.

It is also known that the resin grommet including thick portions formed to protrude at each certain interval in the inner-diameter direction is molded beforehand, the grommet is held in a mold, and thereafter the resin bellows are injection-molded or blow-molded to integrate the grommet and bellows in the mold (see Japanese Utility Model Application Laid-Open No. 2-22463 and Japanese Patent Application Laid-Open No. 2002-286048, for example).

However, when the bellows and the grommet are separately molded, and fitted/assembled into each other as in a constitution described in U.S. Pat. No. 5,529,538, and when the grommet is fitted into the inner periphery of the bellows large-diameter side end portion, the bellows and the grommet shift from each other unless a fitting operation is carefully performed. Since the shifting causes grease leakage, an assembly operation becomes intricate in order to prevent the shifting.

Moreover, after attaching the grommet to the outer periphery of the tripod joint, the large-diameter side end portion of the bellows may also be attached from the outside. Even in this case, unless the operation is carefully performed, the bellows large-diameter side end portion and the grommet shift from each other, and there is a possibility that the grease leaks.

Furthermore, in the prior art described in Japanese Utility Model Application Laid-Open No. 2-22463 and Japanese Patent Application Laid-Open No. 2002-286048, any special technical means is not applied to a place where the grommet and bellows are integrated. Therefore, even when they are apparently integrated, they are not firmly fusion-bonded to each other, the apparently integrated place peels, and, as a result, a disadvantage such as a grease leakage is caused.

To solve the problem, the present inventors have succeeded in development of a newly useful method in which a core mold is disposed in a large-diameter side end portion of a primary molded member, molded beforehand integrally with a bellows portion and a small-diameter side end portion in primary molding, and held in a mold. Moreover, a secondary molded member including a thick portion adapted to an axial-direction groove in the outer peripheral surface of a tripod joint casing is injection-molded between a large-diameter side end portion inner surface of the primary molded member and a core mold outer peripheral surface. Accordingly, disadvantages of the above-described prior arts, such as operation intricacy and grease leakage have been solved (Japanese Patent Application No. 2003-041317).

Moreover, the present inventors have further found a problem in the newly developed inventive useful technique.

That is, in the manufacturing method developed by the present inventors, in consideration of ease of extracting of the boot from the core mold after the secondary molding, the thick portion has been protruded as little as possible in a boot axial center direction from the inner surface of a small-diameter portion just in the vicinity of the large-diameter side end portion in the bellows portion. However, when the end portion of the thick portion is positioned in the vicinity of the bellows portion on the inner surface of the small-diameter portion, flexing properties of the small-diameter portion (referred to also as the valley portion) just in the vicinity of the large-diameter side end portion in the bellows portion are impaired. Therefore, to obtain a desired bend angle, necessary returning times of the large-diameter portion (referred to also as the mountain portion) and the small-diameter portion have to be increased to increase the size of the boot in some case.

To solve the problem, the present inventors have used the small-diameter portion just in the vicinity of the large-diameter side end portion of the bellows portion as an original function of the small-diameter portion of the bellows portion. That is, to obtain a large locking angle (obtain the flexing properties of the small-diameter portion just in the vicinity of the large-diameter side end portion of the bellows portion) while keeping the boot to be compact, the secondary molding has been performed in order to position the end portion of the thick portion in the vicinity of the bellows portion in the vicinity of an outer-diameter direction from the small-diameter portion inner surface just in the vicinity of the large-diameter side end portion of the bellows portion.

Accordingly, the flexing properties of the small-diameter portion just in the vicinity of the large-diameter side end portion of the bellows portion can be obtained. While the boot is kept to be compact, the large rocking angle can be obtained.

However, when a contact position of the end portion of the thick portion in the vicinity of the bellows portion is disposed in the vicinity of the outer-diameter side from the inner surface of the small-diameter portion just in the vicinity of the large-diameter side end portion of the bellows portion, an undercut portion is formed in the thick portion.

In this case, the secondary molding ends, and the boot in which the secondary molded member constituted of a portion having different thicknesses is molded integrally with the large-diameter side end portion inner surface of the primary molded member is pulled out of the core mold. However, since the undercut portion is easily caught by the core mold, the boot is pulled out by so-called forcible extraction. The forcible extraction sometimes deforms or damages the boot as a product. Therefore, the present inventors have considered that the extraction is to be avoided in order to provide a stable product, and have developed the present invention.

SUMMARY OF THE INVENTION

The present invention has been developed to solve problems of related arts, and an object thereof is to provide a boot for a constant-velocity universal joint, in which a secondary molded member including a thick portion is formed on an inner peripheral portion of a large-diameter side end portion formed as a primary molded member. In the boot, a tapered surface extending to the large-diameter side end portion from a small-diameter portion just in the vicinity of the large-diameter side end portion of a bellows portion is provided with a position where an end portion of the thick portion in the vicinity of the bellows portion constituting a secondary molded member contacts the inner peripheral portion of the large-diameter side end portion formed as the primary molded member. Even when the thick portion is provided with an undercut portion, the boot can be easily pulled out of a core mold, and the small-diameter portion just in the vicinity of the large-diameter side end portion of the bellows portion is usable with an original function of the small-diameter portion of the bellows portion. While the boot is kept to be compact, a large rocking angle is achieved. Accordingly, the boot can be compact and lightweight, and cost reduction can be achieved.

Technical means developed by the present invention to achieve the above-described object is a method of manufacturing a boot for a constant-velocity universal joint, including a large-diameter side end portion into which a casing of a tripod joint including a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and a plurality of thin portions arranged between the thick portions, the method comprising the steps of: holding a primary molded member molded including the small-diameter side end portion and the large-diameter side end portion on opposite ends communicating with an inner space of the bellows portion in a mold, disposing a core mold in the large-diameter side end portion of the primary molded member, and holding the small-diameter portion just in the vicinity of the large-diameter side end portion by a mold inner peripheral surface and a core mold outer peripheral surface to form a secondary molding space for molding a secondary molded portion constituted of the thick portions and the thin portions in either or both of the inner peripheral surface and the outer peripheral surface of the large-diameter side end portion between a large-diameter side end portion inner peripheral surface of the primary molded member and a core mold outer peripheral surface, between the mold inner peripheral surface and the large-diameter side end portion outer peripheral surface of the primary molded member, or between the core mold outer peripheral surface and the mold inner peripheral surface via the inner/outer peripheral surface of the large-diameter side end portion of the primary molded member; positioning a molten material injection point for secondary molding in one or a plurality of optional places in the secondary molding space, and injecting a molten material into the secondary molding space via the injection point to mold a secondary molded portion on either or both of the inner peripheral surface and the outer peripheral surface of the large-diameter side end portion of the primary molded member; and integrally molding a secondary molded member on either or both of the inner peripheral surface and the outer peripheral surface of the large-diameter side end portion of the primary molded member to form the boot, moving at least a part of the core mold outer peripheral surface which abuts on the end portion of the thick portion in the vicinity of the bellows portion in a central axial direction of the core mold to remove the part from a thick portion region just before separating the boot from the core mold, and separating the core mold from the boot in this state.

According to the present invention, a part of the outer peripheral surface of the core mold, which is easily caught when pulling the boot as a product from the core mold and which abuts on the end portion of the thick portion in the vicinity of the bellows portion is disposed on an inner-diameter side. Therefore, the boot is easily pulled out of the core mold, and forcible extracting in a so-called undercut portion can be prevented.

Accordingly, since the end portion of the thick portion in the vicinity of the bellows portion can be shifted in an outer-diameter direction, the small-diameter portion just in the vicinity of the large-diameter side end portion in the bellows portion can be effectively bent.

Therefore, the boot itself is kept to be compact while a large rocking angle can be achieved. Therefore, the bellows portion and the whole boot can be downsized. Since the portion can be thinned, the boot can be lightened. Furthermore, since the whole boot is downsized, an amount of grease charged in the boot may be small, and cost can be reduced.

Moreover, the step of molding the secondary molded portion may include the steps of: applying a pressure of the molten material injected into the secondary molding space to a tapered surface extending toward the large-diameter side end portion from the small-diameter portion just in the vicinity of the large-diameter side end portion held between the mold inner peripheral surface and the core mold outer peripheral surface; expanding the tapered surface compressed by the injection pressure of the molten material toward the small-diameter portion; and pressure-welding the small-diameter portion held between the mold inner peripheral surface and the core mold outer peripheral surface onto either or both of the core mold outer peripheral surface and the mold inner peripheral surface by the expanding of the tapered surface.

According to the present invention, a resin injected into the secondary molding space presses the tapered surface extending to the large-diameter side end portion from the small-diameter portion just in the vicinity of the large-diameter side end portion of the bellows portion before reaching a sealed portion between the core mold outer peripheral surface and the small-diameter portion inner peripheral surface or between the mold inner peripheral surface and the small-diameter portion outer peripheral surface, and compresses a primary molding material in the vicinity of the tapered surface to generate a stress for expansion in an in-plane direction. Accordingly, the small-diameter portion inner surface of the bellows portion is pressed onto the outer peripheral surface of the core mold, or the small-diameter portion outer surface is pressed onto the mold inner peripheral surface, and a so-called self-sealing effect is produced. Therefore, the material in the secondary molding can be prevented from leaking.

In this case, the small-diameter portion is held by a protrusion of the mold fitted into the small-diameter portion outer surface just in the vicinity of the large-diameter side end portion, and a concave peripheral groove in the core mold outer peripheral surface into which the small-diameter portion inner surface is fitted.

Moreover, in the step of molding the secondary molded portion, a molten material injection point for secondary molding is positioned in one or a plurality of optional places of a thin portion molding space in a secondary molding space, and a direction $\theta$ of an injection gate is set to $0° \leq \theta \leq 90°$ with respect to either or both of the inner peripheral surface and the outer peripheral surface of the large-diameter side end portion of the primary molded member. Moreover, assuming that a distance between the inner peripheral surface or the outer peripheral surface of the large-diameter side end portion of the primary molded member and an injection gate center is t and that a diametric direction distance of an injection-side end portion of the secondary molding space is a, a position of the injection gate is set to $0 \leq t \leq 2a/3$, the molten material is injected so as to bring the molten material into sliding contact with either or both of the inner peripheral surface and the outer peripheral surface of the large-diameter side end portion of the primary molded member, and the molten material may be charged into the secondary molding space.

When the molten material injection point for the secondary molding is disposed in one or a plurality of optional places of the thin portion molding space in the secondary molding space, the thin portion molding space from the injection gate to a thick portion molding space also serves as a runner. While a high-temperature state is maintained, the molten material is momentarily fed into the thick portion molding space at a high speed/temperature, and therefore weld or air entrainment does not occur. Either or both of the inner peripheral surface and the outer peripheral surface of the bellows large-diameter side end portion is completely fusion-bonded to the portion having different thicknesses formed by the secondary molding.

Moreover, when this method is used, impurities on the inner peripheral surface or the outer peripheral surface of the large-diameter side end portion of the bellows portion are washed away, heat of the molten material is transferred to the inner peripheral surface or the outer peripheral surface of the large-diameter side end portion of the bellows portion, and the inner peripheral surface or the outer peripheral surface is fused. Therefore, either or both the inner peripheral surface and the outer peripheral surface of the large-diameter side end portion of the bellows portion is fusion-bonded to the molten material injected into the secondary molding space, and completely integrated with the material.

Furthermore, one or two pins are inserted/disposed at an interval in the thick portion molding space in the secondary molding space, and thereafter the molten material is injected to form one or two holes in the thick portion.

Accordingly, since a volume of the thick portion is reduced, a cooling time of the thin portion can closely match or resemble that of the thick portion. Furthermore, since turbulence occurrence at a time when the molten resin flows through the thick portion molding space is remarkably little, weld or air entrainment does not occur.

Examples of an apparatus for use in the method of manufacturing the boot for the constant-velocity universal joint include the following apparatus.

There is provided an apparatus of manufacturing a boot for a constant-velocity universal joint, including a large-diameter side end portion into which a casing of a tripod joint including a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and a plurality of thin portions arranged between the thick portions, the apparatus comprising: divided molds which hold an outer surface of a primary molded member; a core mold inserted into the large-diameter side end portion of the primary molded member held by the divided molds; and an injection mechanism which injects/charges a molten material into a secondary molding space constituted of a thick portion molding space and a thin portion molding space formed between a large-diameter side end portion inner peripheral surface of the primary molded member and a core mold outer peripheral surface, between a mold inner peripheral surface and the large-diameter side end portion outer peripheral surface of the primary molded member, or between the core mold outer peripheral surface and the mold inner peripheral surface via the inner/outer peripheral surface of the large-diameter side end portion of the primary molded member, the core mold including a first mold section forming the thin portion molding space, a second mold section including a removable portion slidable in a core mold central axial direction and forming the thick portion molding space, and an operation section for sliding/operating the removable portion of the second mold section in the core mold central axial direction, the first and second mold sections being provided with concave peripheral grooves in tip-side outer peripheral surfaces to hold the small-diameter portion just in the vicinity of the large-diameter side end portion between the mold inner peripheral surface and the concave peripheral groove, the concave peripheral groove being brought into close contact with a whole peripheral region of the inner surface of the small-diameter portion just in the vicinity of the large-diameter side end portion, the concave peripheral groove including a peripheral edge on a molten material injection side positioned on a tapered surface extending toward the large-diameter side end portion from the small-diameter portion just in the vicinity of the large-diameter side end portion in the bellows portion to hold the tapered surface between the mold inner peripheral surface and the peripheral groove, the injection mechanism being constituted so as to dispose a molten material injection point in one or a plurality of optional places in the secondary molding space.

According to the abovedescribed apparatus, the function/effect by the manufacturing method can be obtained.

Moreover, the manufacturing apparatus includes a pressing portion which is inserted from a small-diameter side end portion of the molded boot and which presses the operation portion of the core mold. When a pressing force is applied to the operation section by a pressing operation of the pressing portion, the operation section lowers/operates, the removable portion of the second mold section slides in the core mold central axial direction, and the removable portion of the second mold section is detached from a thick portion region.

Further in the manufacturing apparatus, a molten material injection point for secondary molding is positioned in one or a plurality of optional places of a thin portion molding space in a secondary molding space, and a direction θ of an injection gate is set to $0° \leq \theta \leq 90°$ with respect to either or both of the inner peripheral surface and the outer peripheral surface of the large-diameter side end portion of the primary molded member. Moreover, assuming that a distance between the inner peripheral surface or the outer peripheral surface of the large-diameter side end portion of bellows portion and an injection gate center is t and that a diametric direction distance of an injection-side end portion of the secondary molding space is a, a position of the injection gate is set to $0 \leq t \leq 2a/3$, the molten material is injected so as to bring the molten material into sliding contact with either or both of the inner peripheral surface and the outer peripheral surface of the large-diameter side end portion of the bellows portion, and the molten material is charged into the secondary molding space.

Additionally, in the manufacturing apparatus, one or two pins are inserted/disposed at an interval in the thick portion molding space constituting the secondary molding space, and thereafter the molten material is injected to form one or two holes in the thick portion.

There is also provided a boot for a constant-velocity universal joint manufactured by the use of each of the above-described apparatus.

There is further provided a boot for a constant-velocity universal joint including a large-diameter side end portion into which a casing of a tripod joint having a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and thin portions arranged between the plurality of thick portions, the boot for a constant-velocity universal joint comprising: a secondary molded portion which is molded by injecting a molten material into either or both of the inner peripheral surface and the outer peripheral surface of the large-diameter side end portion of the primary molded member molded including the small-diameter side end portion and the large-diameter side end portion on opposite ends communicating with an inner space of the bellows portion; the small-diameter portion just in the vicinity of the large-diameter side end portion being held between a concave portion of a core mold disposed in the inner surface including a portion slidable in the central axial direction and a convex portion of a mold disposed in the outer surface when the secondary molded portion is molded by injection, either or both of the core mold and the mold forming a portion of a space for injecting the molten material.

According to the present invention, in a boot for a constant-velocity universal joint in which a secondary molded portion including a thick portion is formed on either or both of an inner peripheral surface and an outer peripheral surface of a large-diameter side end portion formed as a primary molded member, a position where an end portion of the thick portion in the vicinity of a bellows portion contacts an inner peripheral portion of the large-diameter side end portion is disposed in a tapered surface extending to the large-diameter side end portion from a small-diameter portion just in the vicinity of the large-diameter side end portion of the bellows portion. Even when the thick portion is provided with an undercut portion, the boot can be easily pulled out of a core mold.

Moreover, the small-diameter portion just in the vicinity of the large-diameter side end portion of the bellows portion is usable as the original function of the small-diameter portion of the bellows portion. While the boot is kept to be compact, a large rocking angle is achieved. Accordingly, the boot can be downsized and lightened, and cost reduction can be achieved.

DESCRIPTION OF THE PREFERRED EMBODIMENT

An embodiment of a method of manufacturing a boot for a constant-velocity universal joint, to which the present invention is applied, and a manufacturing apparatus for use in the manufacturing method will be described. It is to be noted that the present embodiment is only an embodiment of the present invention, interpretation is not limited to the embodiment, and the embodiment can be appropriately designed/changed in the scope of the present invention.

Figure 1:
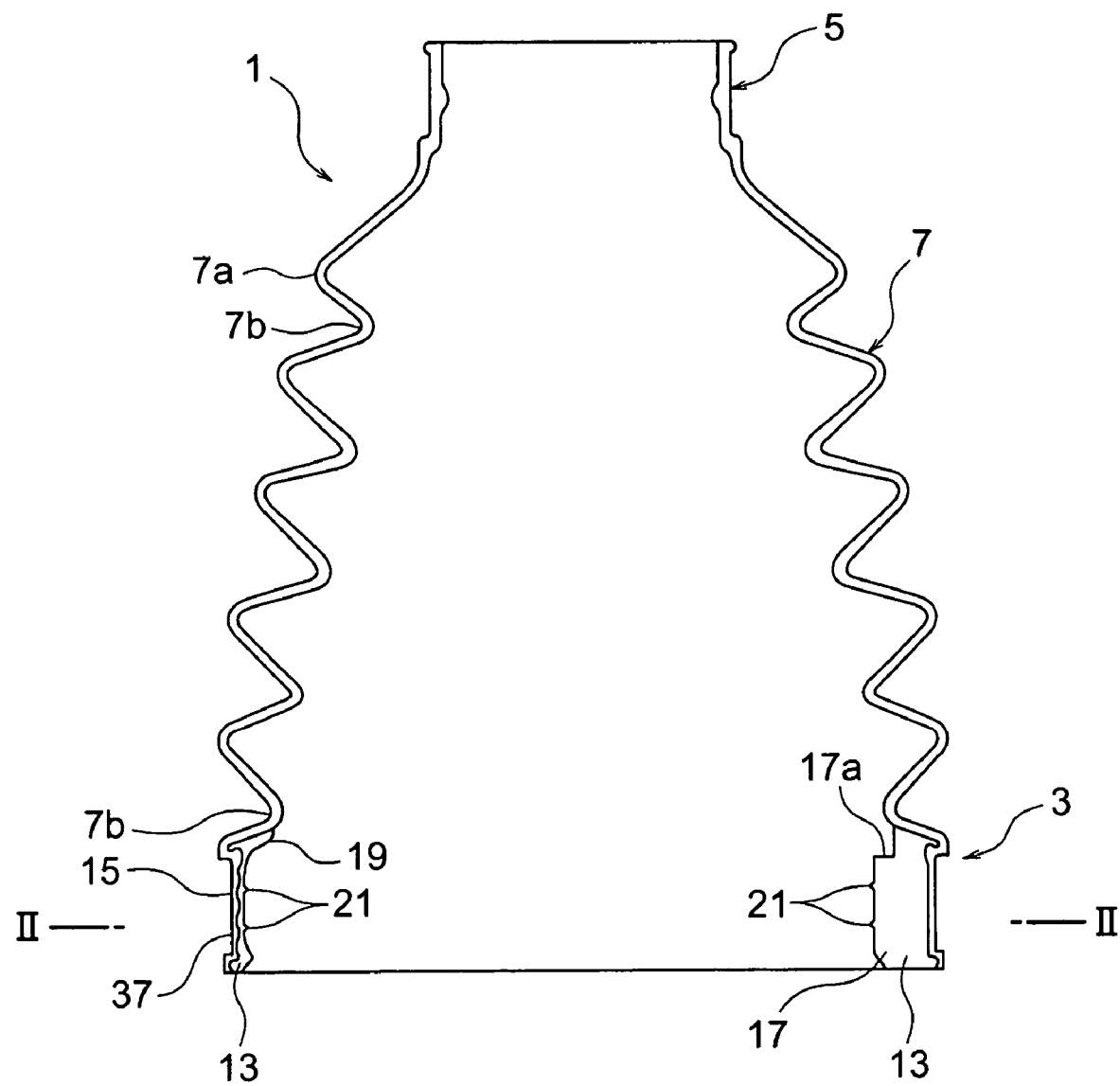
FIG. 1 is a vertical sectional view showing an embodiment of a boot for a constant-velocity universal joint, manufactured according to the present invention.

FIG. 1 is a vertical sectional view showing an embodiment of a boot for a constant-velocity universal joint, manufactured by the manufacturing method and apparatus of the present embodiment.

A boot for a constant-velocity universal joint 1 is used in a tripod joint in which a concave portion is formed in an outer peripheral surface of a casing. That is, for example, grooves formed in circular sectional shapes in an axial direction are formed in three places apart from one another at an equal interval in a peripheral direction of the outer peripheral surface in the casing of the tripod joint.

As shown in FIG. 1, the boot for the constant-velocity universal joint 1 includes a large-diameter side end portion 3 into which the casing of the tripod joint is inserted, and a small-diameter side end portion 5 whose inner and outer diameters are formed to be smaller than those of the large-diameter side end portion 3. In the small-diameter side end portion 5, a shaft portion of a driving shaft connected to the tripod joint is inserted. Moreover, a bellows portion 7 formed in a bellows state is disposed between the large-diameter side end portion 3 and the small-diameter side end portion 5.

Moreover, in the boot 1, the large-diameter side end portion 3, small-diameter side end portion 5, and bellows portion 7 are integrally molded by a known primary molding step using a resin such as thermoplastic elastomer (this molded member will be hereinafter referred to as a primary molded member). Furthermore, on an inner peripheral surface side of the large-diameter side end portion 3, a secondary molded member 13 is formed which is a portion having a different thickness, molded integrally with the primary molded member using the resin such as thermoplastic elastomer.

As shown in FIG. 1, the bellows portion 7 is constituted in such a manner that large-diameter portions (also referred to as the mountain portions) 7a formed to have large diameters and forming a convex outer part of the boot 1, and small-diameter portions (also referred to as the valley portions) 7b formed to have small diameters and forming a concave outer part of the boot 1 are repeatedly formed in a cylindrical axial direction of the boot 1. For example, in the present embodiment, the bellows portion includes five large-diameter portions 7a and five small-diameter portions 7b disposed on a large-diameter side end portion 3 side with respect to these five large-diameter portions 7a. These large-diameter portions 7a and small-diameter portions 7b are formed successively in larger diameters from the small-diameter side end portion 5 toward the large-diameter side end portion 3, and, as a result, the boot 1 is entirely formed substantially in a conical shape.

It is to be noted that in the present embodiment, the bellows portion 7 is not especially limited, and optimum conditions in the scope of the present invention are appropriately applied to conditions such as the thickness of the bellows portion 7 and pitches of the large-diameter portions 7a and small-diameter portions 7b.

Moreover, in the present embodiment, both the large-diameter side end portion 3 and the small-diameter side end portion 5 of the primary molded member are formed in desired uniform thicknesses. These thicknesses are not especially limited, and optimum optional thicknesses are selected.

The conditions of the large-diameter side end portion 3 and the small-diameter side end portion 5 are not especially limited, and the optimum conditions are appropriately applied in the scope of the present invention. It is to be noted that in the present embodiment, the thicknesses of the large-diameter side end portion 3 and small-diameter side end portion 5 are formed to be uniform, but non-uniform thicknesses are also included in the scope of the present invention.

Figure 2:
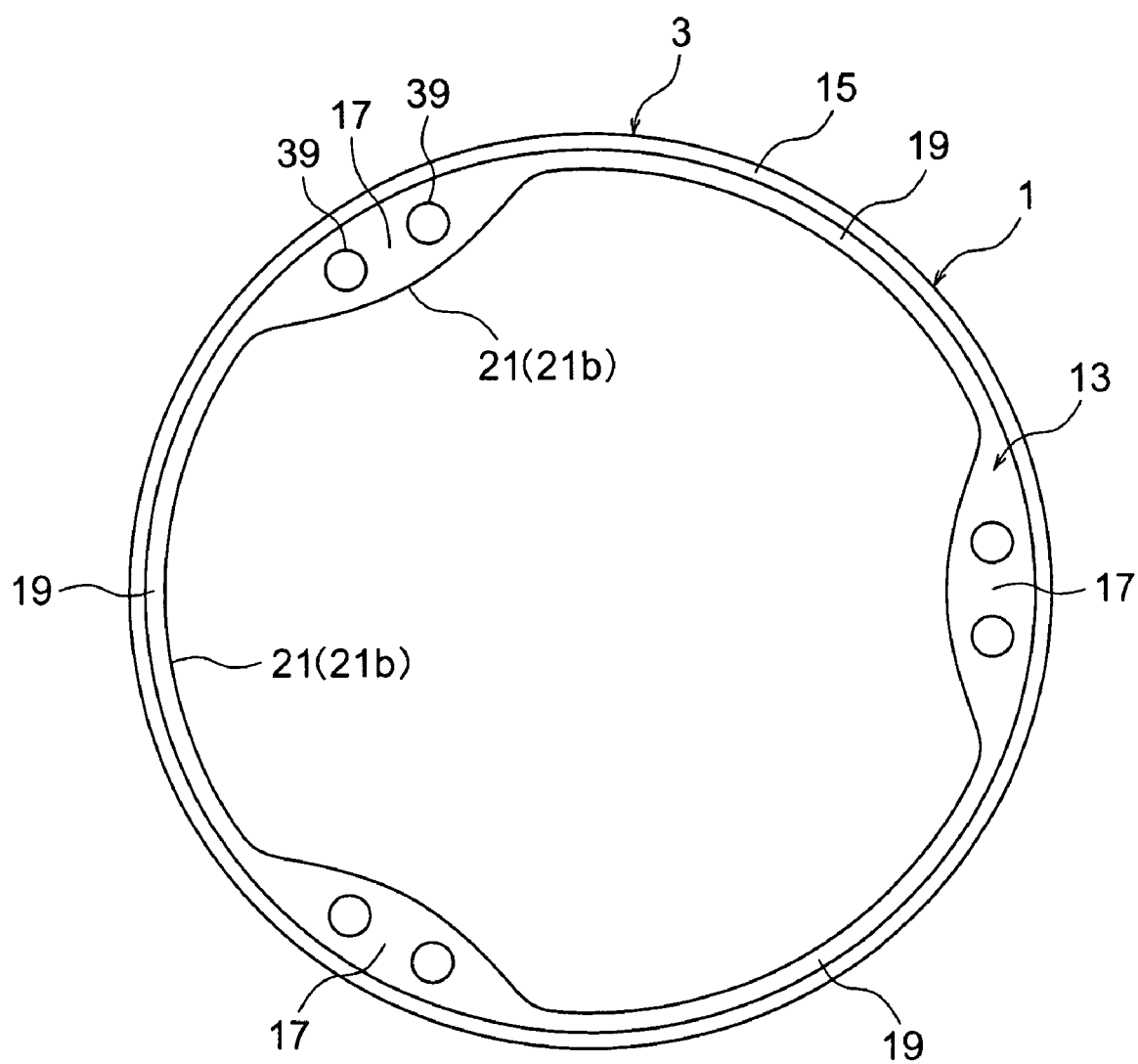
FIG. 2 is an end surface diagram of the boot for the constant-velocity universal joint along line II-II of FIG. 1.

FIG. 2 is an end surface diagram of the boot for the constant-velocity universal joint 1 along line II-II of FIG. 1. As shown in FIGS. 1 and 2, an outer peripheral surface 15 of the large-diameter side end portion 3 which is the primary molded member is formed substantially in a circular shape. A band fastening portion 37 for attaching the boot 1 to a tripod joint is disposed in a concave form in the outer peripheral surface 15. Moreover, in the secondary molded member 13 formed inside the outer peripheral surface 15, a plurality of thick portions 17 formed to protrude on the inner peripheral surface side, and a plurality of thin portions 19 formed between the thick portions 17 are disposed.

As shown in FIG. 2, the thick portions 17 are formed to protrude substantially in circular shapes as viewed in a section in the axial direction of the large-diameter side end portion 3, and have substantially the same sectional shape over the axial direction of the boot 1. The shape of the thick portion 17 is set to be adapted to an axial direction groove in the outer peripheral surface of the casing of the tripod joint to which the boot 1 is attached. Moreover, in the present embodiment, for example, three thick portions 17 are formed apart from one another at substantially equal intervals on the periphery. Three thin portions 19 each having a substantially constant thickness over a peripheral direction are formed among the thick portions 17.

Moreover, as shown in FIG. 1, in the inner peripheral surface of the large-diameter side end portion 3, for example, two parallel sealing lips 21 (21a, 21b) are disposed continuously in the peripheral direction over the surfaces of the thick portions 17 and thin portions 19. The sealing lips 21 are formed as protrusions whose sectional shapes are substantially triangular or trapezoidal, and in the present embodiment, and a top of the lip is R-chamfered.

It is to be noted that the present embodiment shows an example in which two sealing lips 21 (21a, 21b) are disposed, but the number of sealing lips, the shapes thereof and the like are not limited, one or three or more lips may also be disposed, and the lips may be appropriately designed/changed.

Figure 3:
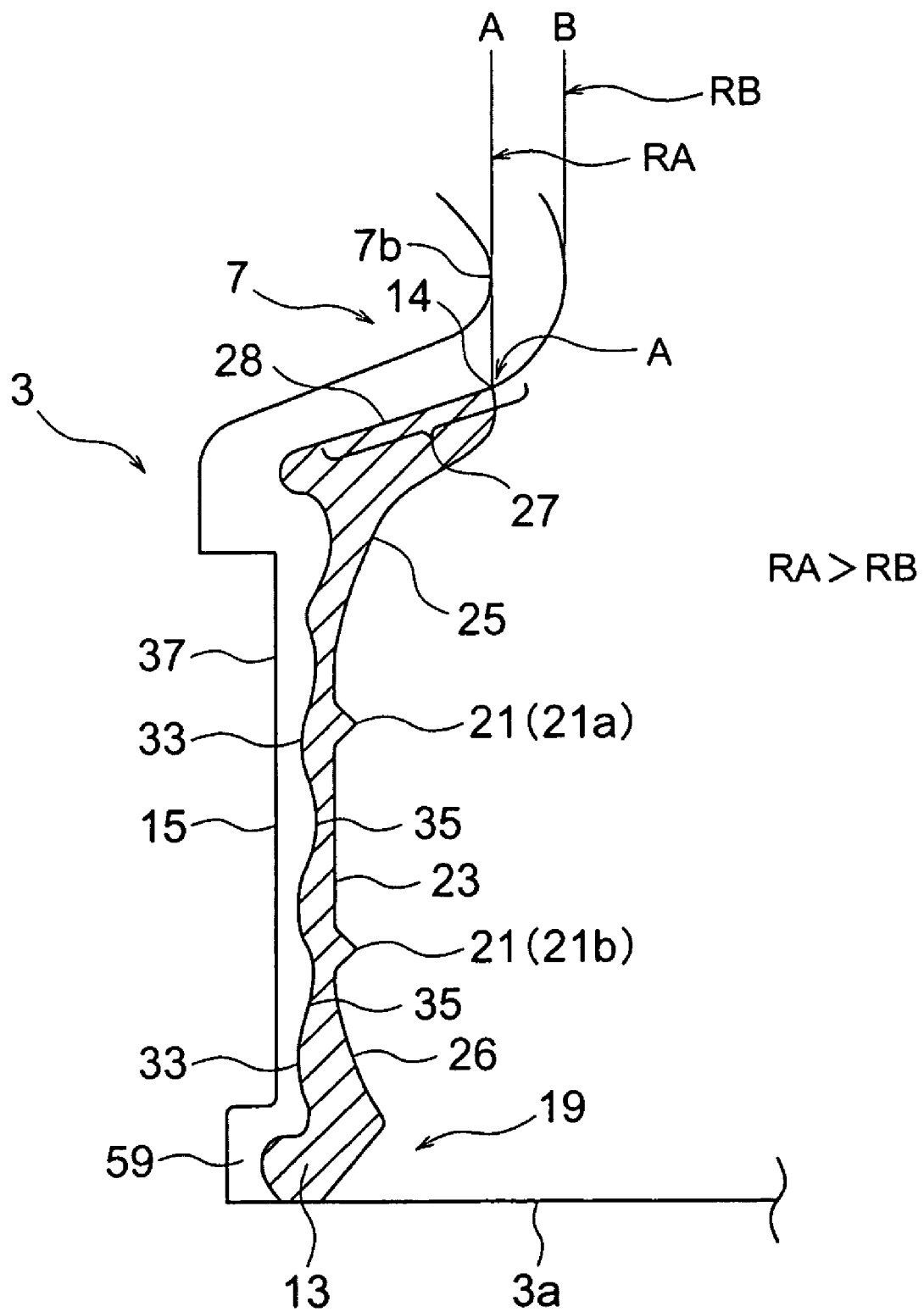
FIG. 3 is an enlarged sectional view of a thin portion of a large-diameter side end portion.
Figure 4:
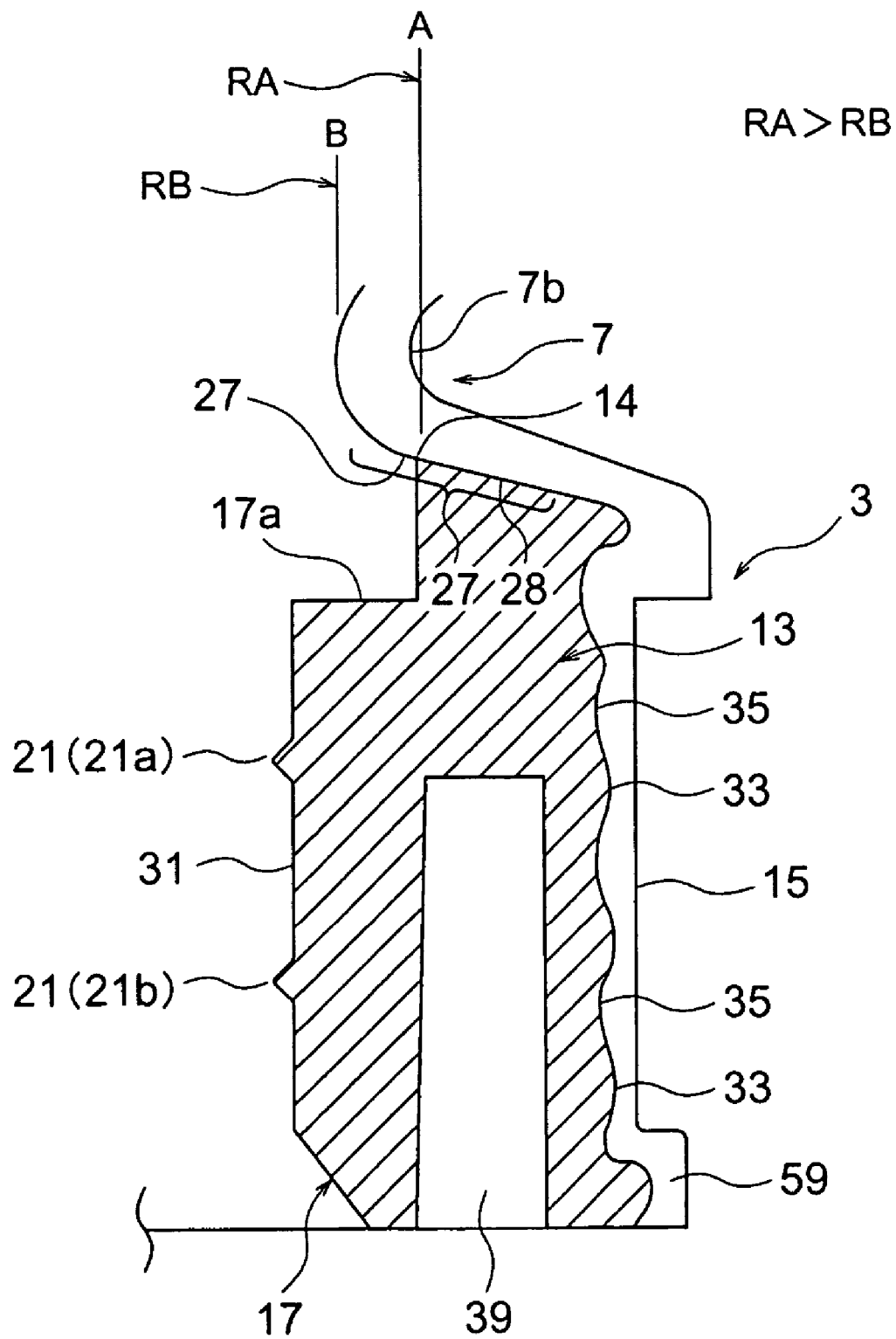
FIG. 4 is an enlarged sectional view of a thick portion of the large-diameter side end portion.

FIG. 3 is an enlarged sectional view of the thin portion 19 in the large-diameter side end portion of the boot 1 shown in FIG. 1, and FIG. 4 is an enlarged sectional view of the thick portion 17 in the large-diameter side end portion of the boot 1 shown in FIG. 1. As shown in FIGS. 3, 4, inner peripheral surface portions 23, 31 of the secondary molded member 13 held between sealing lips 21 (21a, 21b) are formed substantially in constant inner diameters along a cylinder axial direction of the large-diameter side end portion 3.

Moreover, an inner peripheral surface 25 of the secondary molded member 13 on the bellows portion 7 side in two sealing lips 21 in the thin portions 19, that is, on the bellows portion 7 side with respect to the upper sealing lip 21 (21a) in FIG. 3 is formed in such a tapered shape that the inner diameter is gradually reduced toward the bellows portion 7.

Furthermore, an inner peripheral surface 26 in the vicinity of an end surface 3a of the large-diameter side end portion 3 with respect to the lower sealing lip 21 (21b) in FIG. 3 is formed in such a tapered shape that the inner diameter is gradually reduced toward the end surface 3a.

As shown in FIG. 3, a tapered surface 27 which is the inner surface of the bellows portion 7 extending toward the large-diameter side end portion 3 from the small-diameter portion 7b just in the vicinity of the large-diameter side end portion 3 is formed in such a tapered shape that the inner diameter is gradually enlarged toward the large-diameter side end portion 3, that is, downwards in FIG. 3.

The end portion of the secondary molded member 13 on the bellows portion 7 side is formed in layers along the tapered surface 27. Moreover, an end portion 14 of the secondary molded member 13 close to the small-diameter portion 7b just in the vicinity of the large-diameter side end portion 3 is disposed midway in the tapered surface 27, that is, brought into contact with an intermediate portion of the tapered surface 27 in a diametric direction. Therefore, as shown in FIG. 3, assuming that radii of a sealed portion A which is a minimum diameter portion of a bonding surface 28 between the secondary molded member 13 and bellows portion 7, and a place B where the inner diameter of the small-diameter portion 7b of the bellows portion 7 just in the vicinity of the large-diameter side end portion 3 is minimum from a center of the large-diameter side end portion 3 are RA, RB, a relation of RA>RB is obtained.

Moreover, as shown in FIG. 4, also in the thick portion 17, in the same manner as in the above-described thin portion 19, the end portion 14 of the secondary molded member 13 close to the small-diameter portion 7b just in the vicinity of the large-diameter side end portion 3 is disposed midway in the tapered surface 27, that is, brought into contact with the intermediate portion of the tapered surface 27 in the diametric direction. Therefore, as shown in FIG. 4, assuming that radii of the sealed portion A which is a minimum diameter portion of the bonding surface 28 between the secondary molded member 13 and bellows portion 7, and the place B where the inner diameter of the small-diameter portion 7b of the bellows portion 7 just in the vicinity of the large-diameter side end portion 3 is minimum from the center of the large-diameter side end portion 3 are RA, RB, a relation of RA>RB is obtained.

That is, the thick portion 17 is provided with an undercut portion shown by 17a in FIG. 4.

According to the present embodiment, to enhance adhesion of the inner peripheral surface of the large-diameter side end portion 3 with respect to the secondary molded member which is the portion having different thicknesses, concave portions 33 and convex portions 35 are alternately disposed in an end portion height direction of the inner peripheral surface to form the inner peripheral surface in a concave/convex shape.

Moreover, in the present embodiment, as shown in FIGS. 2 and 4, two non-through holes (concave portions) 39 are disposed in the axial direction of the thick portion 17, and this prevents weld or air entrainment from occurring.

It is to be noted that one or two holes 39 are disposed in each thick portion 17. In the present embodiment, the holes 39 are disposed in all the thick portions 17, but any hole may not be disposed, or the holes may also be disposed in optionally selected thick portions. Further in the present embodiment, the hole has a perfectly circular sectional shape, and is formed in such a conical shape that the diameter is reduced in a depth direction (toward the small-diameter side end portion), but optional shapes such as elliptical sectional shape or a teardrop sectional shape can be selected, and the shape may be designed/changed in the scope of the present invention.

Thermoplastic resins constituting the primary molded member constituted of the large-diameter side end portion 3, small-diameter side end portion 5, and bellows portion 7, and the secondary molded member 13 constituted of the portion having different thicknesses are not especially limited, and optimum materials are selected in the scope of the present invention. The same material, materials different in hardness, or different types of materials are also included in the scope of the present invention. It is to be noted that the secondary molded member 13 which is the portion having different thicknesses is preferably formed of a material having a sealing function of preventing grease from leaking. On the other hand, the material of the primary molded member may be selected simply in accordance with an original purpose. That is, materials having flexibility, resistance to heat, resistance to coldness, and the like may be selected.

Next, an example of the manufacturing method and apparatus of manufacturing the above-described boot for the constant-velocity universal joint 1 according to the present invention will be described with reference to FIGS. 5A to 17.

The manufacturing method of the present embodiment is constituted of "primary molding step"→"secondary molding step"→"boot pulling step". After description of each step, the manufacturing apparatus for use in the steps will be described. FIGS. 5A to 5F are schematic diagrams showing the whole flow of the manufacturing method of the present invention.

It is to be noted that in Example 1, an example will be described in which a secondary molding space 43 is formed between the inner peripheral surface of the large-diameter side end portion 3 of the primary molded member disposed between a mold 49 and a core mold 69, and the outer peripheral surface of the core mold, and a molten material is injected into the secondary molding space 43 to integrally mold the secondary molded member which is the portion having different thicknesses. Next, Example 2 is an example in which a secondary molding space 43c is formed between the outer peripheral surface 15 of the large-diameter side end portion 3 and a mold inner peripheral surface 50, and a molten material is injected into the secondary molding space 43c to integrally mold the secondary molded member which is the portion having different thicknesses. Example 3 is an example in which secondary molding spaces 43d, 43e are formed between the outer peripheral surface of the core mold 69 and the mold inner peripheral surface 50 via the inner/outer peripheral surface of the large-diameter side end portion 3, and a molten material is injected into the secondary molding spaces 43d, 43e to integrally mold the secondary molded member which is the portion having different thicknesses.

EXAMPLE 1

"Primary Molding Step"

As a method of molding the primary molded member constituted of the large-diameter side end portion 3, small-diameter side end portion 5, and bellows portion 7, blow molding, injection blow molding and the like are well known, but the method is not especially limited, and an optimum molding method is appropriately applied to the scope of the present invention.

"Secondary Molding Step"

The present step will be described with reference to FIGS. 5A to 8. In the present step, the core mold 69 is inserted into the primary molded member molded in primary molding, and is held in the mold 49 for injection molding, a desired molten material is injected into the mold 49 at a high speed, and the secondary molded member 13 is integrally molded between the inner surface of the outer peripheral surface 15 of the large-diameter side end portion 3 of the primary molded member and the outer surface of the core mold 69. It is to be noted that since a known constitution is applied to a constitution other than the constitution described later, the description is omitted.

The secondary molding step includes (1) a step in which a secondary molding space is formed, and (2) a step in which a secondary molded portion is molded.

"(1) Step in which the secondary molding space is formed"

Figure 5A:
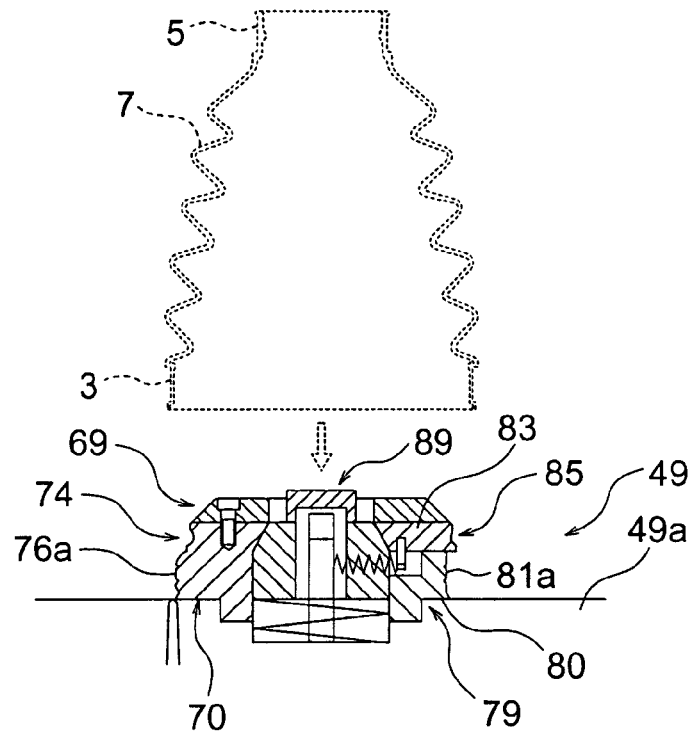
FIG. 5A shows a step of fitting the large-diameter side end portion of a primary molded member into an outer periphery of a core mold.

For example, first, the inner periphery of the large-diameter side end portion 3 of the primary molded member is fitted into the outer periphery of the core mold 69 disposed beforehand on a fixed board 49a side, and the primary molded member is attached to the core mold 69 (FIG. 5A).

Figure 5B:
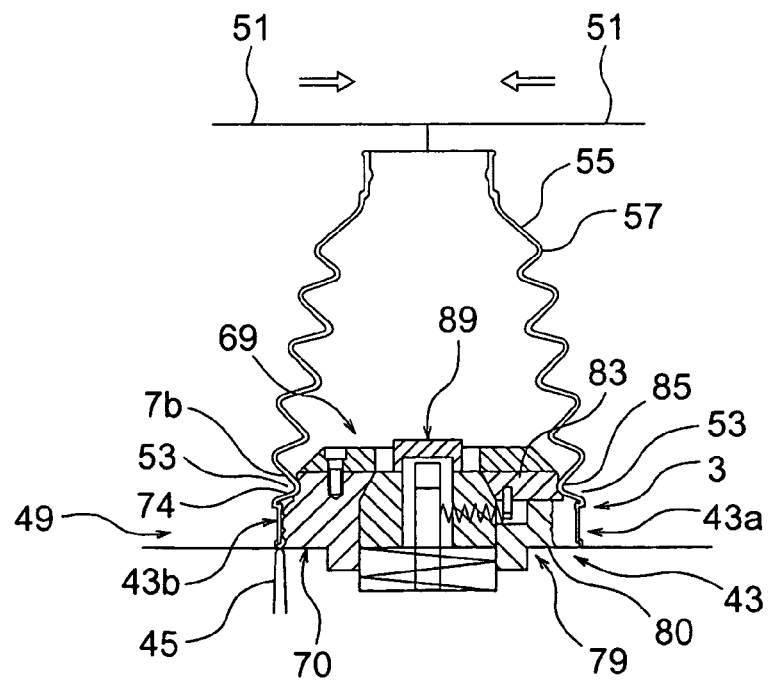
FIG. 5B shows a step of closing divided molds to dispose the primary molded member in a mold.

Next, the primary molded member in which the large-diameter side end portion 3 is fitted into the outer periphery of the core mold 69 as described above is disposed/held in the mold 49, when divided molds 51 are clamped (FIG. 5B).

When the divided molds 51 are clamped in this manner, as shown in FIG. 5B, protrusions 53 on the inner surfaces of the divided molds 51 fit into the whole region of the outer surface of the small-diameter portions 7b just in the vicinity of the large-diameter side end portion 3 of the bellows portion 7. Moreover, concave peripheral grooves 74, 85 concaved in the tip-side outer peripheral surface of the core mold 69 fit in the whole inner surface of the small-diameter portions 7b, and the small-diameter portions 7b are held by the protrusions 53 of the divided molds 51 and the concave peripheral grooves 74, 85 of the core mold 69.

Figure 6:
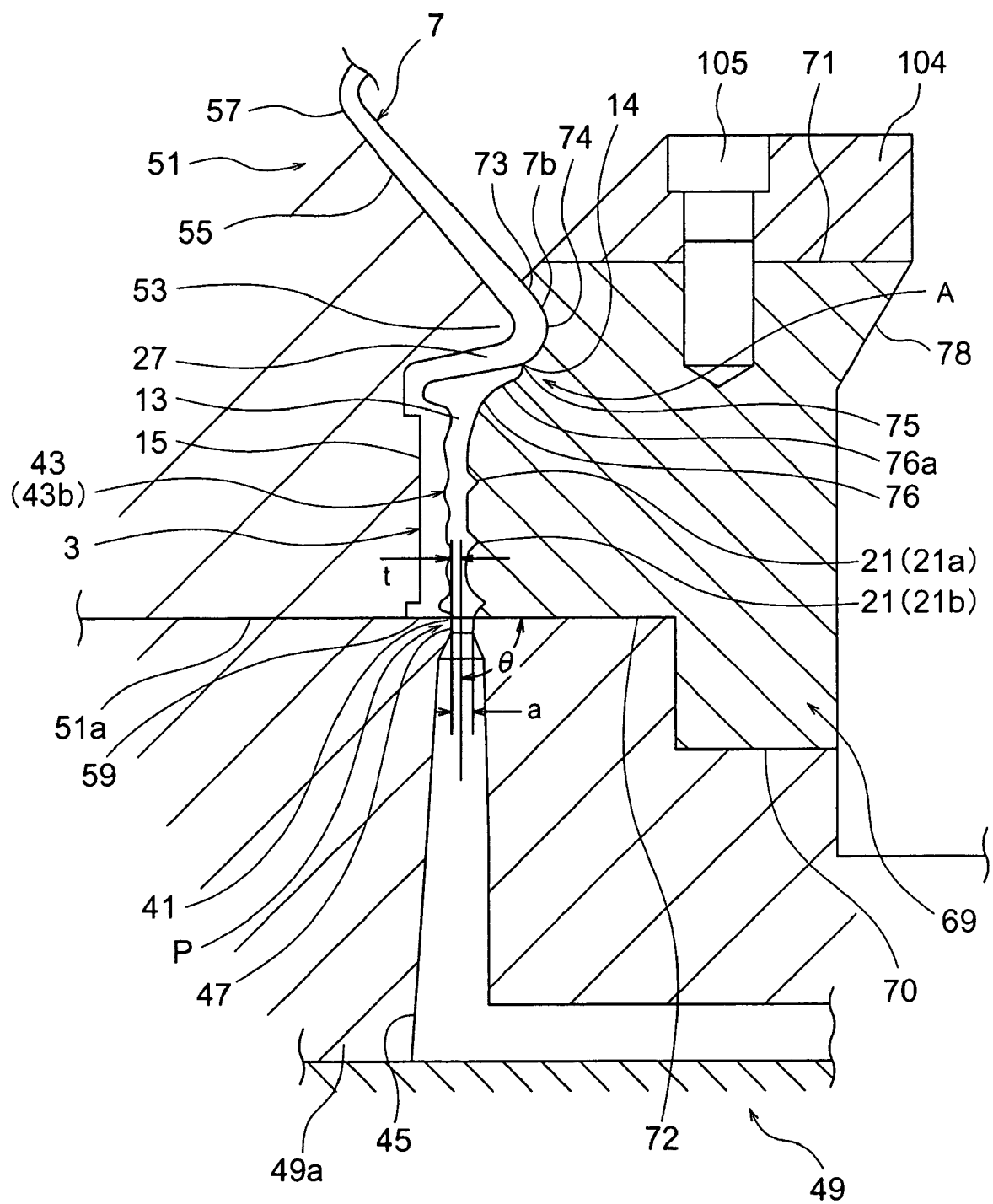
FIG. 6 is a schematic enlarged sectional view showing an example of the secondary molding step of the present embodiment.

Through this step, as shown in FIGS. 5B and 6, the sealed portion A is formed in the held portion of the small-diameter portion 7b, and the secondary molding space 43 for molding the secondary molded member 13 constituted of the thick portions 17 and thin portions 19 on the inner peripheral surface of the large-diameter side end portion 3 is formed between the inner peripheral surface of the large-diameter side end portion 3 of the primary molded member and outer peripheral surfaces 76, 81 of the core mold 69.

In the secondary molding space 43 of the present example, since concave portions are formed in the outer peripheral surface 81 of a second mold section 79 of the core mold 69, the thick portion molding space 43a is formed between the concave portion and the inner periphery of the large-diameter side end portion 3, and the thin portion molding space 43b communicating with the thick portion molding space 43a is formed between the outer peripheral surface 76 of a first mold section 70 of the core mold 69.

It is to be noted that the above-described present step is only an example, and another step may also be used in the scope of the present invention, and the step may be appropriately designed/changed.

"(2) Step in which the secondary molded portion is molded"

Figure 5C:
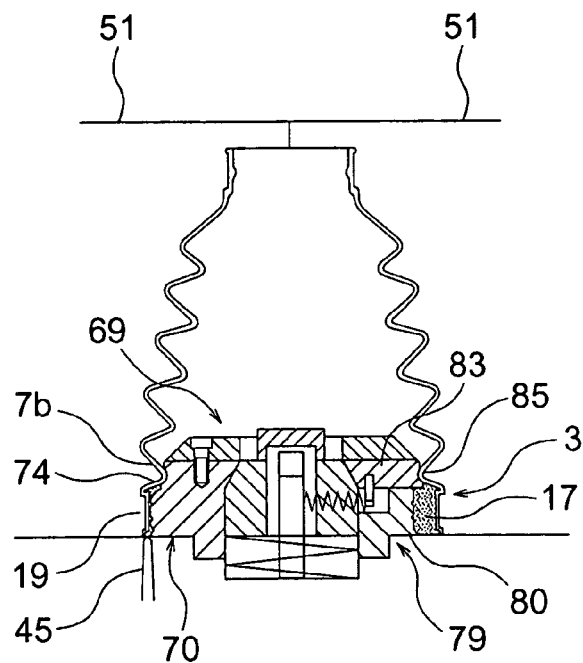
FIG. 5C shows a step of injecting a thermoplastic resin into a secondary molding space to integrally mold a secondary molded member.

First, molten material injection point P for the secondary molding is positioned in one or a plurality of optional places of the thin portion molding space 43b in the secondary molding space 43 formed by the above-described step. Moreover, the molten thermoplastic resin heated, for example, at a high temperature of 260° C. or more is injected into the secondary molding space 43 via the injection point P at the high speed to integrally mold the secondary molded member 13 portion on the inner peripheral surface of the large-diameter side end portion 3 of the primary molded member (FIGS. 5C, 6).

It is to be noted that, as described above, the injected thermoplastic resin is, for example, at 260° C. or more, but this is not especially limited, and may be appropriately designed/changed in such a range that any defect is not generated in the material.

Figure 7:
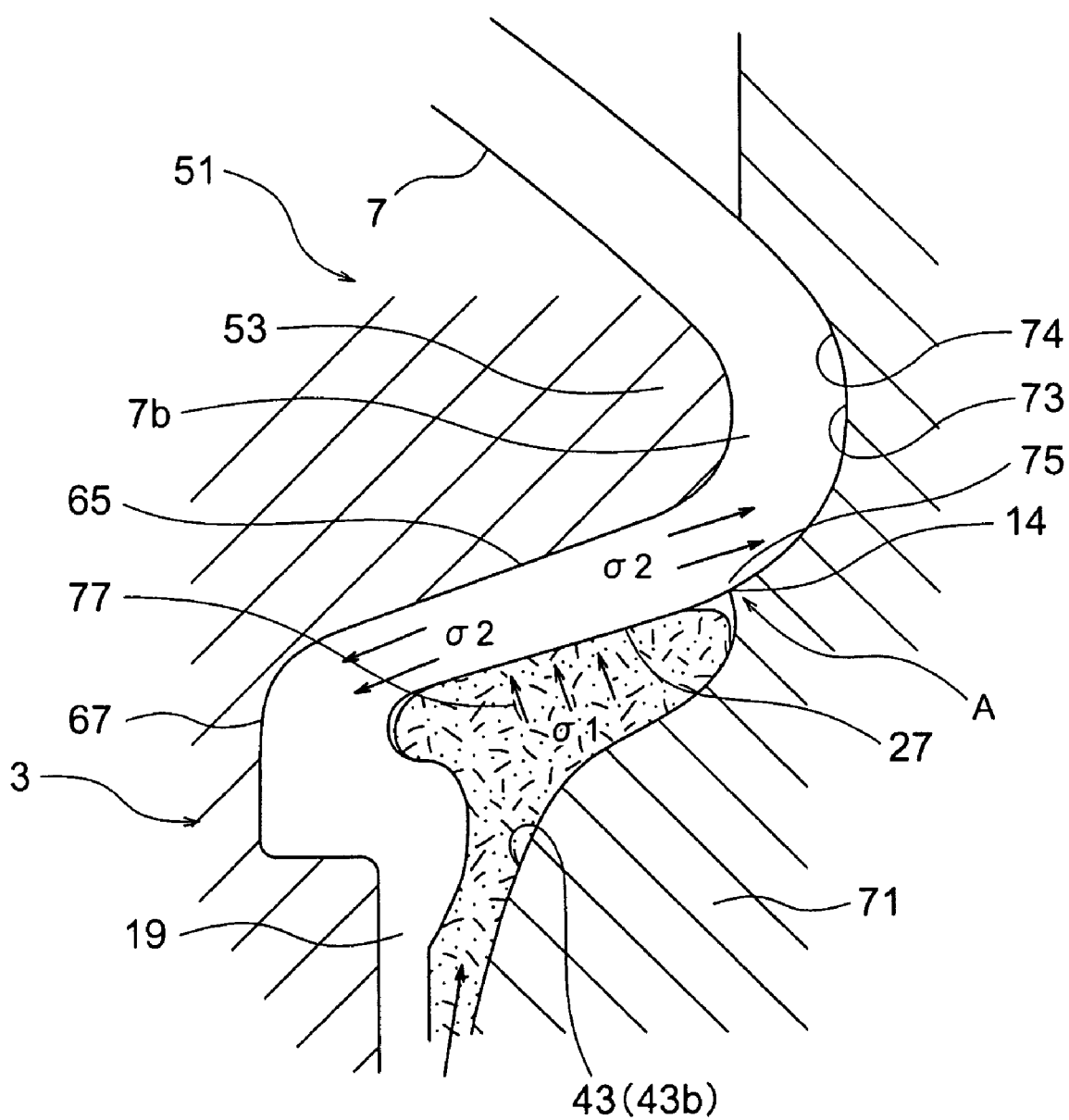
FIG. 7 is a schematic diagram showing that a secondary molding material is injected into a secondary molding space in a manufacturing method and apparatus for the boot for the constant-velocity universal joint of the present embodiment.

Moreover, the steps for molding the secondary molded member 13 portion include the following steps 1 to 3 (see FIG. 7).

(Step 1)

A pressure of the molten material injected into the secondary molding space 43 is applied to the tapered surface 27 extending toward the large-diameter side end portion 3 from the small-diameter portion 7b just in the vicinity of the large-diameter side end portion 3 in the primary molded member held between the inner peripheral surface of the protrusion 53 of the mold 49 and the concave peripheral grooves 74, 85 of the outer peripheral surface of the tip of the core mold 69.

(Step 2)

The tapered surface 27 compressed by the injection pressure of the molten material is expanded toward the small-diameter portion 7b.

(Step 3)

When the tapered surface 27 is expanded, the small-diameter portion 7b held between the inner peripheral surface of the protrusion 53 of the mold 49 and the outer peripheral surfaces of the concave peripheral grooves 74, 85 of the core mold 69 is pressure-welded to the outer peripheral surfaces of the concave peripheral grooves 74, 85 of the core mold 69.

As described above, the steps for molding the secondary molded member 13 portion include Steps 1 to 3. Therefore, when the secondary molding material is injected into the secondary molding space 43, the secondary molding material does not easily leak from the sealed portion A between the inner surface of the small-diameter portion 7b just in the vicinity of the large-diameter side end portion 3 in the primary molded member and the concave peripheral grooves 74, 85 in the tip outer peripheral surface of the core mold 69. The present inventors consider that this is achieved by the following principle.

FIG. 7 is a diagram showing that the secondary molding material is injected into the secondary molding space 43 in the manufacturing method and apparatus for the boot for the constant-velocity universal joint of the present example.

As shown in FIG. 7, a flow-direction front end portion (the front end portion of the resin is shown by arrows 77) of the molten resin as the secondary molding material which has flown into the secondary molding space 43 reaches the tapered surface 27 extending to the large-diameter side end portion 3 from the small-diameter portion 7b just in the vicinity of the large-diameter side end portion 3 in the bellows portion 7.

Moreover, the molten resin functions to pressurize the tapered surface 27 by the injection pressure, and it is recognized that a stress σ1 shown in FIG. 7 is accordingly generated (Step 1 described above).

In this case, since a surface portion 65 of the divided mold 51 exists on a back-surface side of the tapered surface 27, the material of the pressed primary molded member is pressurized, and tries to expand to the outside in a direction intersecting with the stress σ1, that is, along the tapered surface 27.

It is recognized that a stress σ2 shown in FIG. 7 is accordingly generated (Step 2 described above).

However, in a direction in which the stress θ2 is applied, a surface portion 67 of the divided mold 51 abutting on the outer peripheral surface of the large-diameter side end portion 3, and the concave peripheral grooves 74, 85 of the outer periphery just in the vicinity of the tip of the core mold 69 exist. In either case, a so-called dead end is generated.

Therefore, the primary molding material existing between the surface portion 67 and the concave peripheral grooves 74, 85 is in a so-called stretching state, and presses the surfaces.

Therefore, an adhesion between the inner surface of the small-diameter portion 7b of the bellows portion 7 and the concave peripheral grooves 74, 85 of the outer periphery just in the vicinity of the tip of the core mold 69 is enhanced. It is considered that a so-called self-sealing effect is produced against leakage of the secondary molding material between the small-diameter portion 7b inner surface and the concave peripheral grooves 74, 85 (Step 3 described above).

Moreover, when conditions of injection of the thermoplastic resin into the secondary molding space 43 are set as follows, the primary molded member is more firmly fusion-bonded to the secondary molded member.

That is, as shown in FIG. 6, a direction θ of the injection gate 47 is set under conditions of $0° \leq θ \leq 90°$ with respect to the inner surface of the outer peripheral surface 15 of the large-diameter side end portion 3. Moreover, assuming that a distance between the inner surface of the outer peripheral surface 15 of the large-diameter side end portion 3 and the injection gate 47 is t and that a diametric direction distance of an injection-side end portion 41 of the secondary molding space 43 is a, position conditions of the injection gate 47 are set to $0 \leq t \leq 2a/3$.

Accordingly, the thermoplastic resin is injected at the high temperature to sliding-contact the inner surface of the outer peripheral surface 15 of the large-diameter side end portion 3 at the high speed, and is charged into the secondary molding space 43.

At this time, since the thermoplastic resin injected at the high temperature flows into the space in sliding contact with the inner periphery of the outer peripheral surface 15 of the large-diameter side end portion 3, impurities of the material for the primary molding, attached to the inner peripheral surface of the outer peripheral surface 15 are washed away. Moreover, the heat of the thermoplastic resin which has flown at the high temperature/speed is transferred to the inner peripheral surface to melt the surface. Therefore, the injected thermoplastic resin is firmly fusion-bonded to the surface of the primary molding material molten by the heat of the thermoplastic resin, and the secondary molded member 13 is molded integrally on the inner peripheral surface side of the large-diameter side end portion 3.

"Boot Pulling Step"

The boot 1 is formed in which the secondary molded member is molded integrally with the inner peripheral surface of the large-diameter side end portion 3 of the primary molded member by the secondary molding step (FIGS. 5A to 5C described above).

As shown in FIG. 4, the undercut portion 17a protruding in a boot axial center direction is disposed on the thick portion 17 on the inner surface of the large-diameter side end portion 3 of the boot 1 molded in this manner.

Figure 5D:
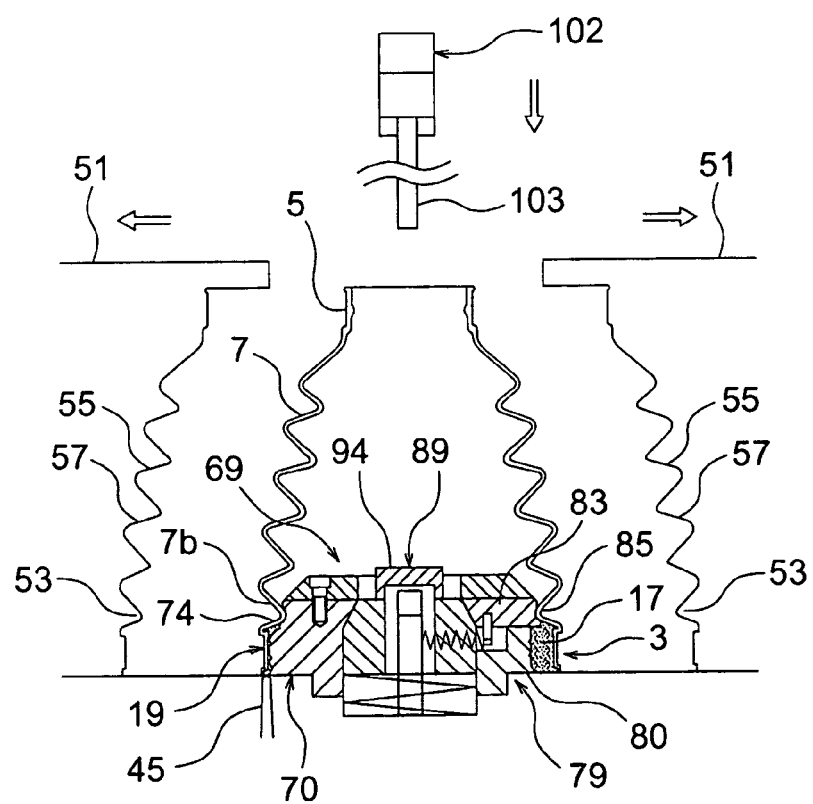
FIG. 5D shows a step of opening the divided molds after molding the secondary molded member.
Figure 5E:
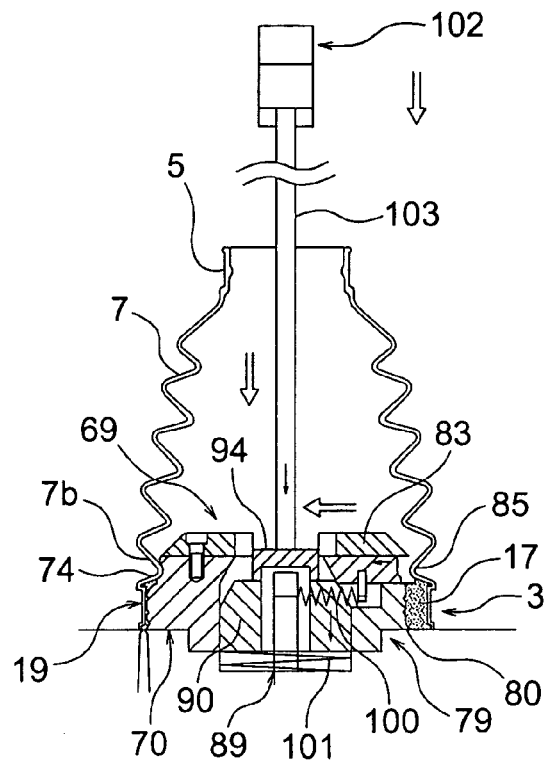
FIG. 5E shows a step of moving a removable portion of the core mold in a central axial direction of the core mold to detach the portion from a thick portion region.

Moreover, first a portion (e.g., a removable portion 83 described later) of the core mold 69 outer peripheral surface abutting on a bellows portion side end portion 17b of the thick portion 17 in the vicinity of at least the bellows portion 7 is moved in the central axial direction of the core mold 69 and removed from the thick portion region just before separating the boot 1 from the core mold 69 (FIG. 5E).

Figure 5F:
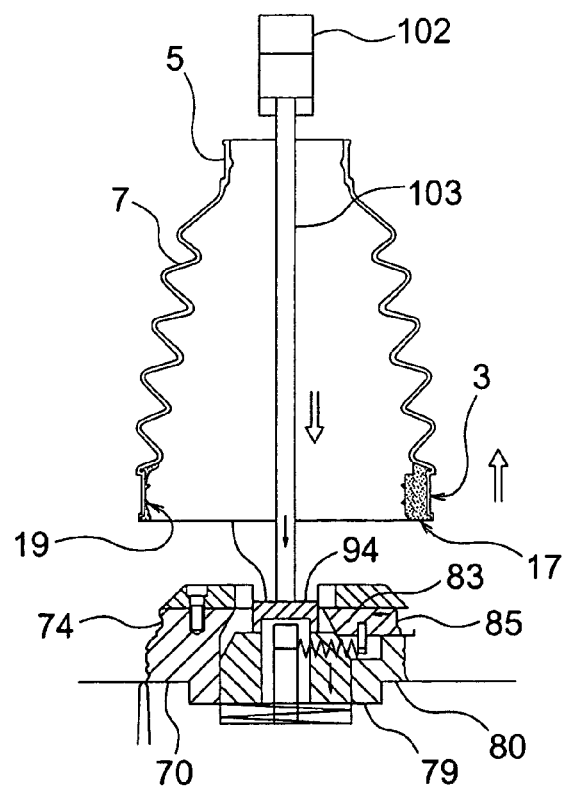
FIG. 5F shows a step of pulling/separating the boot which is a molded member from the core mold.

Accordingly, a core mold portion which is caught by the undercut portion 17a of the thick portion 17 when pulling the thick portion 17 out of the core mold 69 is eliminated, and the boot 1 is drawn/separated from the core mold 69 in this state (FIG. 5F).

A concrete example of the core mold 69 for use in the present manufacturing method will be described later in detail.

Next, a schematic structure of the mold 49 which is the main part of the manufacturing apparatus for use in the manufacturing method of the present invention will be described. As shown in FIGS. 5A to 12B, the mold 49 for the injection molding which is the main part of the present apparatus includes divided molds 51 constituting a movable board side, and a core mold 69 disposed on a fixed board 49a side.

Figure 8:
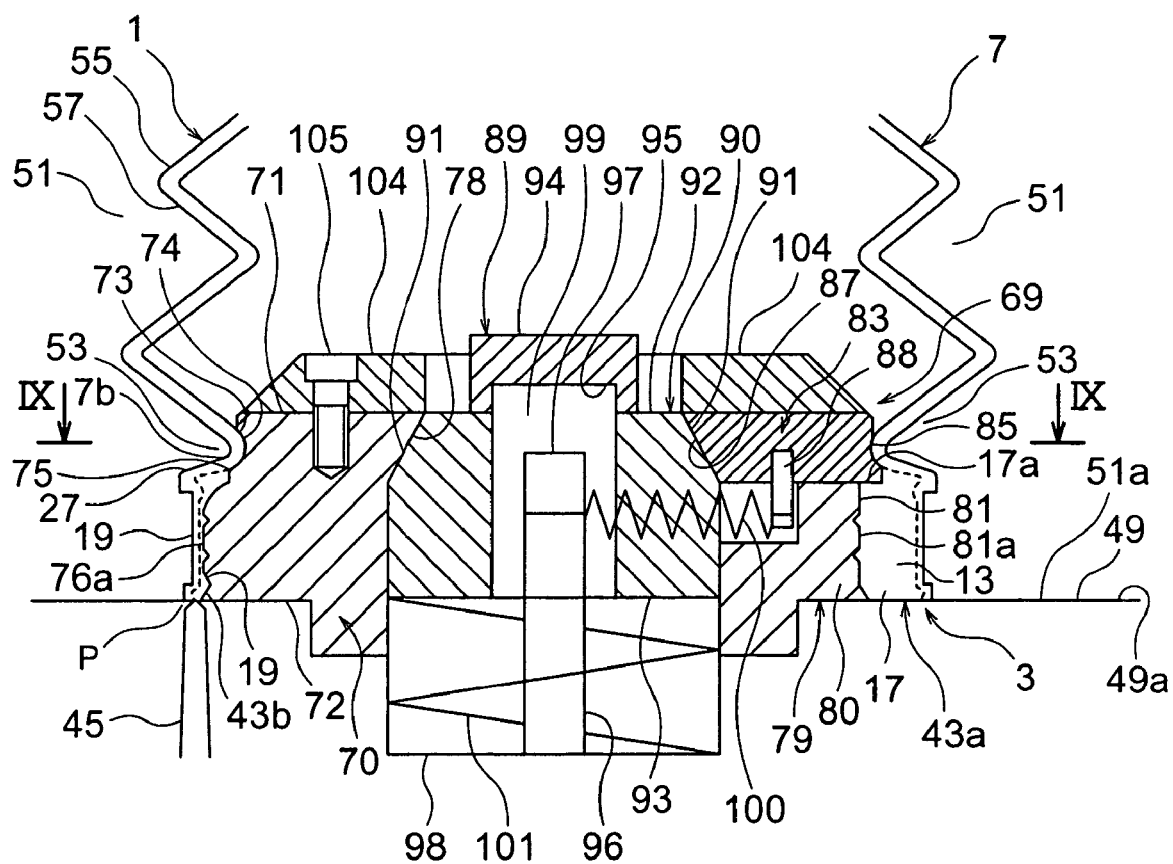
FIG. 8 is an enlarged sectional view showing a part around the core mold in the secondary molding step in a state before moving the removable portion.
Figure 9:
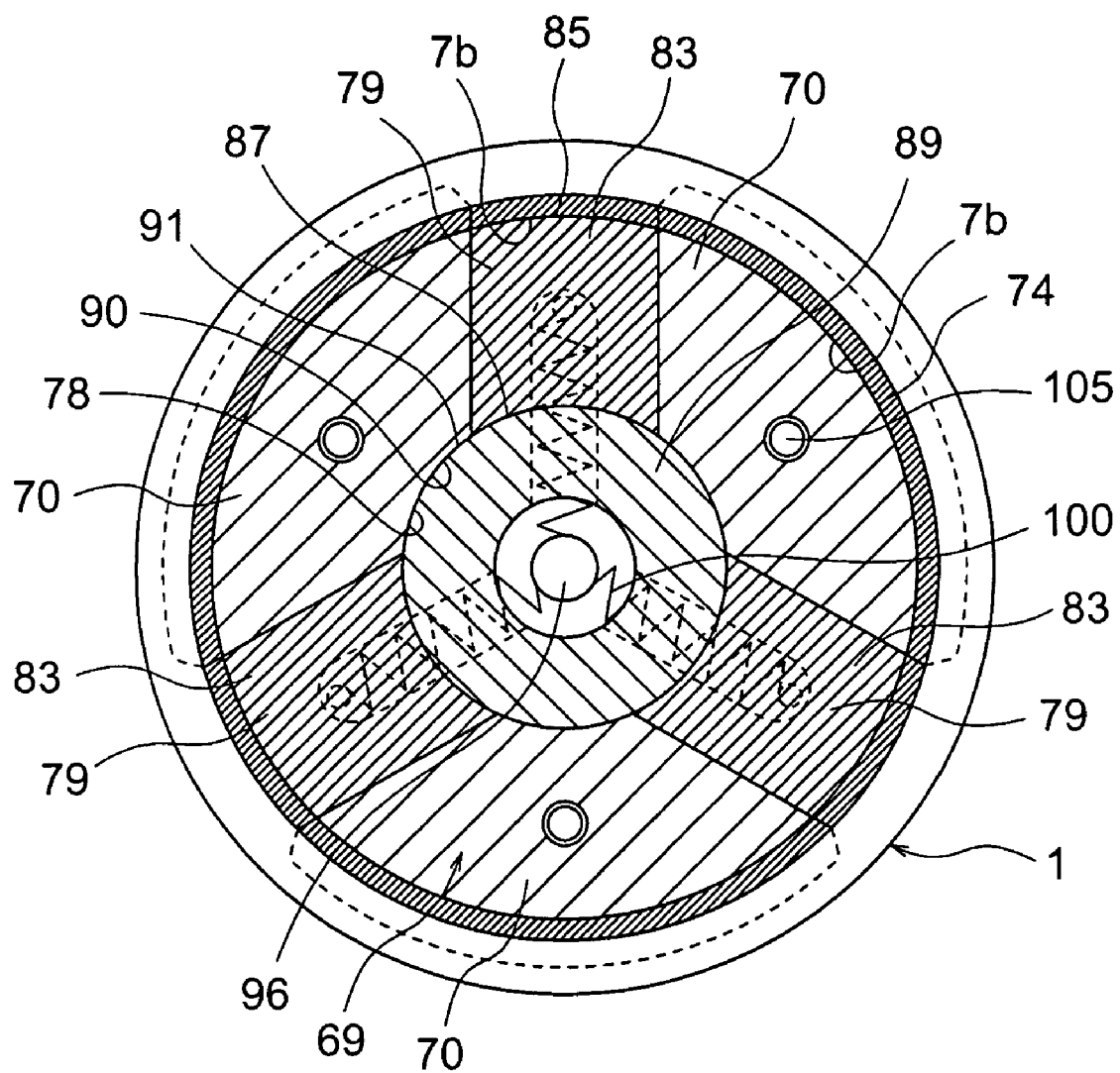
FIG. 9 is a sectional view along line IX-IX of FIG. 8.

As shown in FIGS. 6 and 8, an outline 57 to which an outer shape of the primary molded member is closely attached is formed on the inner surfaces of the divided molds 51.

A space 55 for storing the primary molded member is formed in such a manner that an opening edge 59 of the outer peripheral surface 15 of the large-diameter side end portion 3 of the primary molded member stored in the primary molded member storage space 55 is positioned in the same plane as that of a lower end surface 51a of the divided mold 51 when closing the molds.

In the fixed board 49a of the mold 49, as shown in FIG. 6, a gate 47 is formed from which the thermoplastic resin is injected into the secondary molding space 43 via a runner 45. In the present example, the gate 47 is disposed in one or a plurality of optionally selected places of a thin portion molding space 43b. That is, when a thermoplastic resin injection point P for the secondary molding is disposed in one or a plurality of optional places of the thin portion molding space 43b in the secondary molding space 43, the thin portion molding space 43b from the injection gate 47 to a thick portion molding space 43a also serves as a narrow runner. While a high-temperature state is maintained, the molten material is momentarily fed into the thick portion molding space 43a at a high speed/temperature, therefore the weld or air entrainment does not occur, and the large-diameter side end portion 3 inner surface of the primary molded member is completely fusion-bonded to the outer surface of the secondary molded member 13.

Needless to say, the gate 47 may also be disposed in one or a plurality of optionally selected places of the thick portion molding space 43a, or in one or a plurality of optionally selected places including the thin portion molding space 43b and thick portion molding space 43a without any problem.

Moreover, as shown in FIGS. 2 and 4, in the embodiment in which the thick portion 17 is provided with one or two holes 39, protrusions for forming the holes 39 (not shown) may be disposed at an constant interval in desired places (three places in the present embodiment) of the fixed board 49a. Accordingly, the holes 39 are simultaneously molded at a secondary molding time.

It is to be noted that the gate 47 is disposed in a thick portion molding space 43a, and the thermoplastic resin may also be injected only from the thick portion molding space 43a or from a plurality of places including the thick portion molding space 43a. However, from the standpoints of prevention of generation of air or weld defect, the gate 47 is preferably disposed in a thin portion molding space 43b as in the present example.

As shown in FIGS. 8 to 12B, the core mold 69 is constituted of an operation section 89 disposed in a central portion, first mold sections 70 forming thin portion molding spaces 43b, and second mold sections 79 forming thick portion molding spaces 43a, and formed entirely in a disc shape having a desired thickness. The first mold sections and the second mold sections are alternately disposed in a peripheral direction.

Moreover, an outer peripheral diameter of the core mold 69 is designed to constitute an inner diameter of the secondary molded member formed on the inner surface of the large-diameter side end portion 3 of the primary molded member. It is to be noted that an inner diameter of the secondary molded member is set so as to fit in an outer diameter of the casing of the tripod joint which is an attaching object.

As shown in FIGS. 6 to 11, the first mold section 70 substantially has a fan shape as viewed in a plane, and is formed in a thickness extending over at least a tip surface (upper end surface in FIG. 8) 71 positioned in a small-diameter side end portion 5 direction from the small-diameter portion 7b just in the vicinity of the large-diameter side end portion 3 of the primary molded member and in an outer diameter direction from the small-diameter portion 7b inner surface, and a lower end surface (lower end surface in FIG. 8) 72 positioned in the same plane as that of the large-diameter side end portion end surface 3a. Moreover, three first mold sections are disposed at a desired interval in a peripheral direction centering on the operation section 89. A tip side outer periphery 73 is provided with the concave peripheral groove 74 into which the inner surface of the small-diameter portion 7b just in the vicinity of the large-diameter side end portion 3 in the primary molded member fits. The outer peripheral surface 76 extending to the lower end surface 72 from a peripheral edge 75 of the concave peripheral groove 74 on the molten material injection side is provided with a surface portion 76a forming an inner surface shape of the thin portion 19 formed between the inner peripheral surface of the large-diameter side end portion 3 of the primary molded member and the outer peripheral surface of the first mold section.

As shown in FIGS. 8 to 12B, the second mold section 79 is disposed between the adjacent first mold sections 70, 70, and is constituted of a fixed portion 80 disposed integrally with the first mold section 70 and having a substantial fan shape as viewed in the plane, and a removable portion (a portion of the second mold section) 83 constituted to be slidable on the fixed portion 80 in the central axial direction of the core mold 69 in accordance with a vertical moving operation of the operation section 89.

Figure 12A:
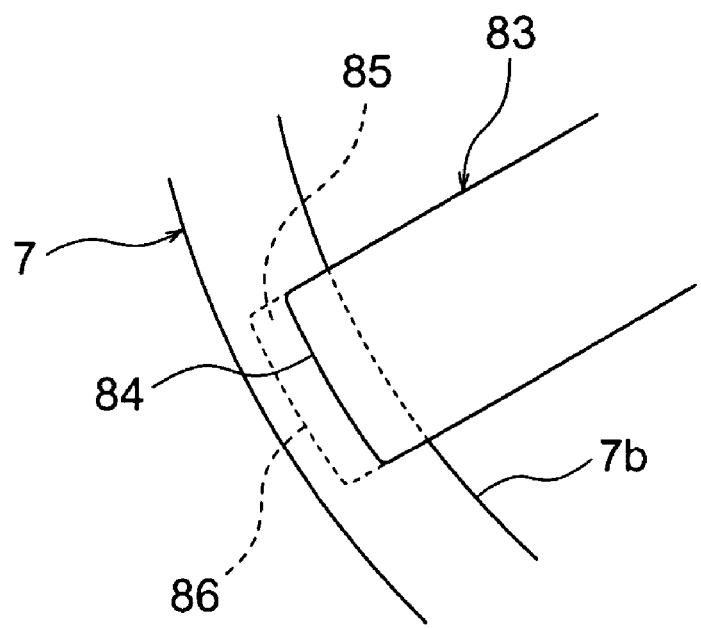
FIG. 12A is a schematic diagram partially showing a state in which the removable portion fits in the small-diameter portion just in the vicinity of the large-diameter side end portion.
Figure 12B:
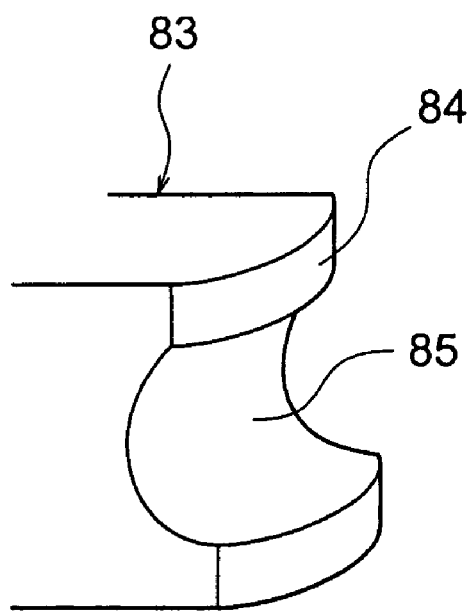
FIG. 12B is a schematic enlarged view showing a concave peripheral groove disposed in a tip-side outer periphery of the removable portion.

The second mold section 79 is constituted in a width disposed between the adjacent first mold sections 70, 70 and in a thickness equal to that of the first mold section 70. Three second mold sections are disposed in a peripheral direction centering on the operation section 89. A tip side outer periphery 84 of the removable portion 83 is provided with a concave peripheral groove 85 into which the inner surface of the small-diameter portion 7b just in the vicinity of the large-diameter side end portion 3 in the primary molded member fits as shown in FIG. 12 or the like. The outer peripheral surface 81 of the fixed portion 80 is provided with a surface portion 81a forming the inner surface shape of the thick portion 17 formed between the outer peripheral surface, and the inner peripheral surface of the large-diameter side end portion 3 of the primary molded member.

In the removable portion 83, although not shown, insertion pieces extending in a diametric direction are disposed on right/left side surfaces of the removable portion 83 which slide on and contact the side surface of the adjacent first mold sections 70, 70. Moreover, a guide rail shaped guide groove extending along the diametric direction is disposed in the right/left side surfaces of the first mold section 70. The insertion piece of the removable portion 83 is inserted/disposed in the guide groove in the side surface of the first mold section 70. When this constitution is used, the removable portion 83 is slidable along the guide groove.

It is to be noted that either or both of the insertion piece and the guide groove may be coated with a material having little frictional resistance or a surface treatment. It is to be noted that the slidable constitution of the removable portion 83 is not limited, and may be designed/changed in the scope of the present invention.

When the inner surface of the small-diameter portion 7b is fitted into the concave peripheral groove 74 of the first mold section 70 and the concave peripheral groove 85 of the second mold section, the whole peripheral region of the inner surface of the small-diameter portion 7b is tightly fitted in both the diametric direction and the peripheral direction.

Figure 10:
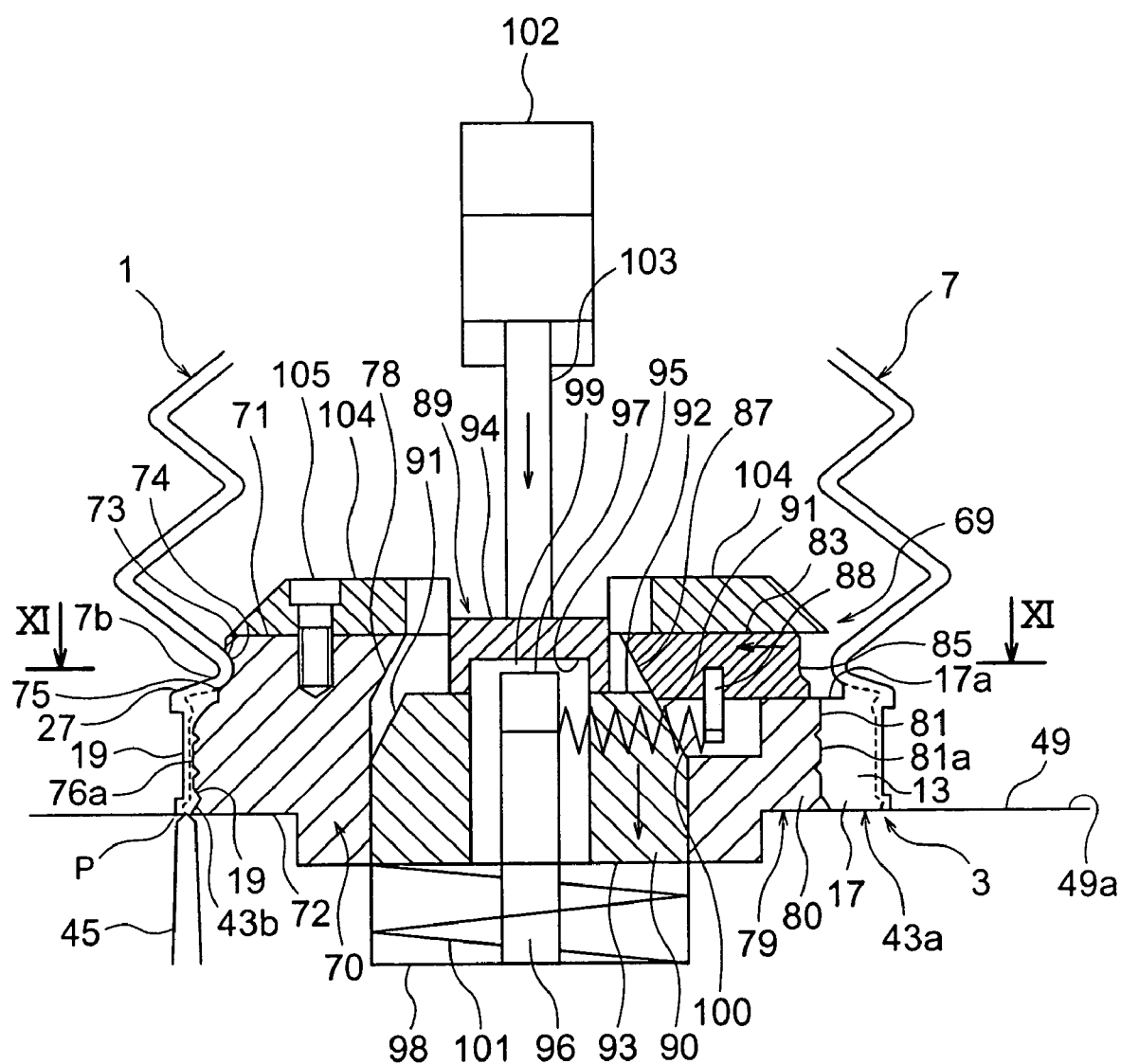
FIG. 10 is an enlarged sectional view showing the part around the core mold in the secondary molding step in a state in which an elevator member is pressed by a pressing member to move the removable portion in a central axial direction of the core mold.

Moreover, as shown in FIGS. 8 and 10, a tip side inner peripheral surface 78 of the first mold section 70 and a removable portion inner peripheral surface 87 of the second mold section 79 are formed in conical surfaces. The respective inner peripheral surfaces 78, 87 constituted of the conical surfaces slidably abut on an outer peripheral surface 91 constituted of the conical surface of an elevator member 90 constituting the operation section 89 described later on the small-diameter side end portion 5 side.

The removable portion 83 is disposed in the second mold section 79 for a purpose of sliding and moving the removable portion 83 in the central axial direction of the core mold 69 when pulling the boot 1 from the core mold 69 after the molding of the secondary molded member to inhibit the undercut portion 17a of the secondarily molded thick portion 17 from being caught by the core mold 69.

In FIGS. 6 and 8, reference numeral 104 denotes a disc-shaped cover (lid) concentric to the core mold 69, and the cover is detachably fixed to the tip surface 71 of the first mold section 70 by a bolt 105.

As shown in FIGS. 8 to 11, the operation section 89 is constituted of the elevator member 90, a columnar portion 96, an elastic member 101 urged between an elevator member lower end surface 93 and the inner surface of a casing 98 so as to constantly push upwards the elevator member 90 in the drawing (small-diameter side end portion 5 direction), and an elastic member 100 urged to constantly attract the removable portion 83 in the central axial direction of the core mold 69.

As shown in FIGS. 8 to 11, the elevator member 90 is a cylindrical member disposed substantially in the central portion of the core mold 69 and constituted to be movable upwards/downwards along the axial direction of the whole core mold 69, and the tip-side outer peripheral surface 91 is formed in a conical surface.

An inclination angle of the conical surface 91 is equal to that of the conical surface of each of the tip-side inner peripheral surface 78 of the first mold section 70 and the removable portion inner peripheral surface 87 of the second mold section 79, and the conical surface 91 slidably abuts on the inner peripheral surface (conical surface) of the removable portion 83.

Moreover, in the present embodiment, a receiving member 94 is disposed on an upper end surface 92 (small end surface disposed in an upper part of FIG. 8) of the elevator member 90, and the receiving member 94 directly receives a pressing force of a pressing member 102. The receiving member 94 is optionally disposed, and the upper end surface 92 of the elevator member 90 may also be pressed directly by the pressing member 102.

As shown in FIGS. 8 to 11, the columnar portion 96 is vertically disposed toward an axial center portion of the elevator member 90 from an inner surface central position of the casing 98. Moreover, one end of the elastic member 100 extended between the columnar portion 96 and the removable portion 83 is fixed to the columnar portion.

It is to be noted that in the present example, as shown in FIG. 8, while any pressing force of the pressing member 102 is not applied to the elevator member 90, the columnar portion has a cylindrical shape vertically disposed in the casing 98 leaving a desired space 99 between a receiving member inner surface 95 and an upper end 97. The space 99 may be appropriately changed in accordance with a range in which the elevator member 90 is movable upwards/downwards in the embodiment.

It is to be noted that the interpretation of the shape of the columnar portion 96 is not especially limited, and the shape may be designed/changed in the scope of the present invention.

The elastic member 101 is disposed between the lower end surface (large end surface existing in a lower part of FIG. 8) 93 of the elevator member 90 and the inner surface of the casing 98, includes the columnar portion 96 in a substantially concentric manner, and constantly urges the elevator member 90 on the small-diameter side end portion 5, that is, upwards in FIG. 8. For example, a spring (coil spring, leaf spring or the like), a rubber member or the like may be appropriately selected in the scope of the present invention.

The elastic member 100 is extended between a fixed pin 88 protruding from the lower surface of the removable portion 83 and the side surface of the columnar portion 96, and urges the removable portion 83 to constantly attract the portion toward the columnar portion 96. For example, the spring (coil spring, leaf spring or the like), the rubber member or the like is appropriately selected in the scope of the present invention.

The pressing member 102 has a constitution capable of pressing the receiving member 94 disposed on the upper end surface (small end surface existing in an upper part of FIG. 8) 92 of the elevator member 90 against elasticity of the elastic member 101 and moving/operating the elevator member 90 downwards. For example, as shown in FIGS. 5D, 5E, 5F, a hydraulic or pneumatic actuator is constituted, and a piston rod 103 expands/contracts in a piston which is an example of the member.

Here, a step of pulling the boot 1 by the use of the core mold 69 which is a concrete example will be described in more detail.

Figure 11:
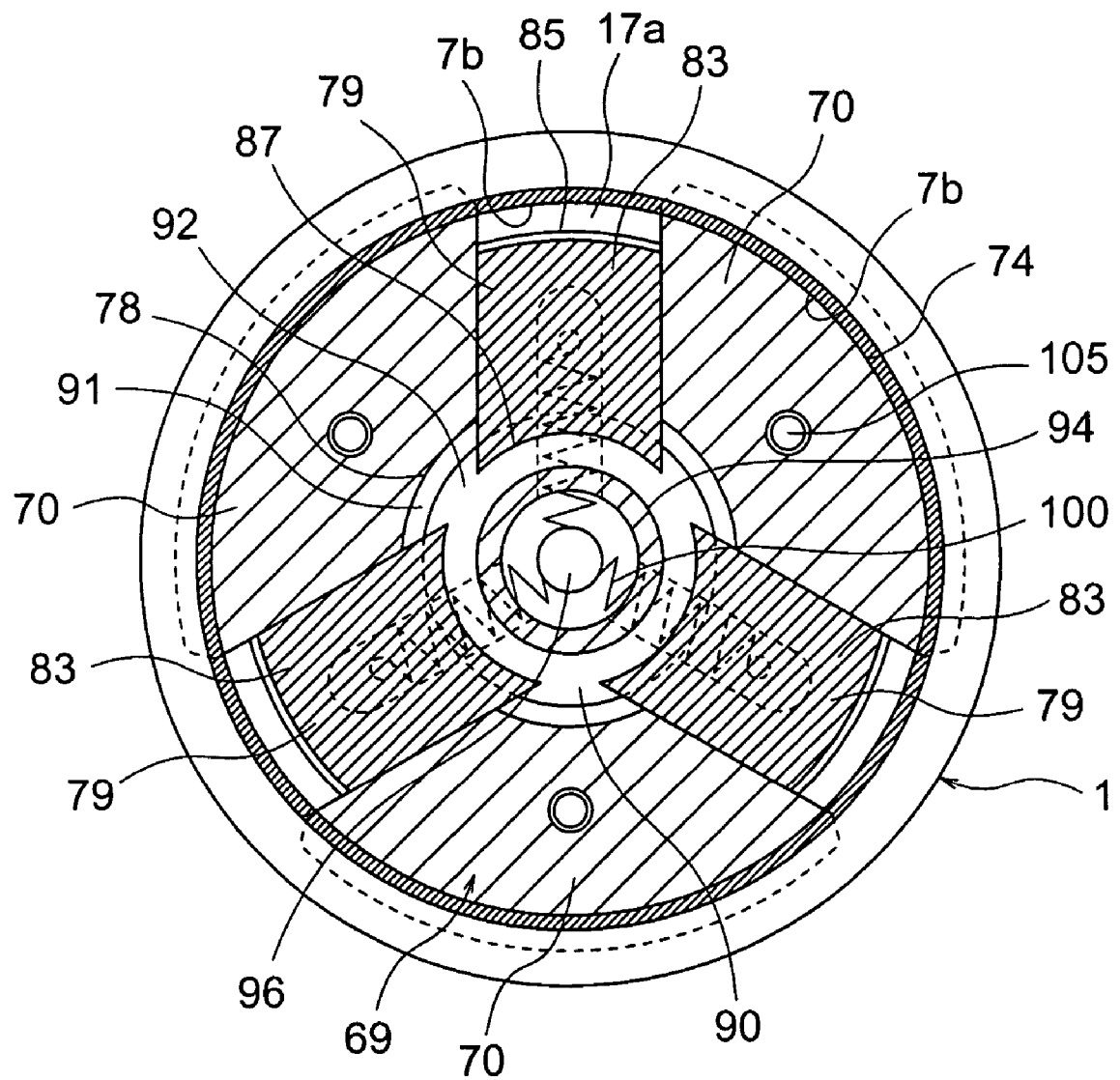
FIG. 11 is a sectional view along line XI-XI of FIG. 10.

The injecting/charging of the secondary molding material ends, the portion having different thicknesses which is a secondary molded member is molded in the large-diameter side end portion 3 of the primary molded member, and the boot 1 is formed as the molded member. Moreover, as shown in FIG. 5D, the divided molds 51 (mold 49) are opened. Next, as shown in FIGS. 5E, 10, and 11, the piston rod 103 of the piston 102 expands, and is inserted into the boot 1 from the small-diameter side end portion 5 of the boot 1.

Subsequently, the receiving member 94 disposed on the upper end surface 92 of the elevator member 90 is pressed via the piston rod 103, and the elevator member 90 lowers/operates downwards in the drawing against elasticity of the elastic member 101.

Accordingly, the conical surface 91 of the elevator member 90 and the inner peripheral surface 87 of the removable portion 83 slide on each other, and the outer diameter of the conical surface 91 of the elevator member 90 which contacts the inner peripheral surface 87 is reduced. Moreover, the removable portion 83 slides/moves in the central axial direction of the core mold 69 by the urging force of the elastic member 100, that is, an attracting force.

Since the removable portion 83 contacting the undercut portion 17a of the thick portion 17 of the boot 1 retreats from the undercut portion 17a (thick portion region), the boot 1 can be easily pulled toward the small-diameter side end portion 5 (upwards in the drawing) from the core mold 69 as shown in FIG. 5F.

Moreover, when the boot 1 is pulled out of the core mold 69, the pressing member 102 contracts again, the pressing force applied to the elastic member 101 is accordingly removed, the elevator member 90 moves toward the small-diameter side end portion 5 (upwards in the drawing) by the elasticity of the elastic member 101, and a state shown in FIG. 8 is recovered.

As described above, according to the present embodiment, the removable portion 83 having the surface contacting the so-called undercut portion 17a retreats in the central axial direction of the core mold 69 at the time of the pulling of the boot 1 which is the molded member. Therefore, the boot 1 which is the molded member is easily pulled out of the core mold 69, and so-called forcible pulling can be prevented. Accordingly, the inner diameter of the position where the thick portion 17 of the secondary molded member 13 contacts the inner surface of the bellows portion 7 can be increased. Therefore, the small-diameter portion 7b just in the vicinity of the large-diameter side end portion 3 in the bellows portion 7 can be effectively bent. To obtain a desired bending angle, the bellows portion 7 and the whole boot 1 can be downsized. Furthermore, reduction of thickness can also contribute to reduction of weight and reduction of materials for use. By the downsizing, an amount of charged grease may be reduced to reduce the cost.

It is to be noted that the present invention is not limited to the above-described embodiment, and may be appropriately changed in the scope of the present invention. For example, the shape of the large-diameter side end portion 3 is not limited to the embodiment, and may be changed. Accordingly, the surface shapes of the core mold 69 and removable portion 83 may also be changed.

Moreover, a method of moving the removable portion 83 is not limited to the embodiment. For example, the actuator may also be disposed in each removable portion 83. The removable portion may also be operated in conjunction with a mechanical link mechanism.

Furthermore, when at least one of the concave portion 33 and the convex portion 35 is simultaneously formed on the inner surface of the large-diameter side end portion 3 of the bellows portion 7 at the above-described primary molding time, the fusion-bonding to the secondary molded member 13 constituted of the portion having different thicknesses is strengthened.

For example, in the present example, as shown in FIGS. 3 and 4, a plurality of concave portions 33 and convex portions 35 continuing in the peripheral direction are alternately disposed in a height direction of the inner surface of the large-diameter side end portion 3. Therefore, a fusion-bonding area of the large-diameter side end portion 3 inner surface constituting the primary molded member and the portion having different thicknesses which is the secondary molded member 13 is broadened, and they are firmly fusion-bonded. It is to be noted that in the present example a plurality of concave portions 33 and convex portions 35 are disposed, but the interpretation is not limited to this as long as the fusion-bonding is strengthened as described above. For example, one or a plurality of individual protrusions or dents may also be disposed. In this case, the length of the protrusion can be optionally set.

Furthermore, as shown in FIGS. 3 and 4, when the convex portions 35 extending in the peripheral direction are formed on the inner surface of the large-diameter side end portion 3 of the bellows portion 7, the convex portions 35 function as weirs, and allow the thermoplastic resin injected into the thin portion molding space 43b from the gate 47 to uniformly flow into the thick portion molding space 43a from the thin portion molding space 43b. That is, when the convex portions 35 functioning also as the weirs are formed, the thermoplastic resin injected into the thin portion molding space 43b at the high speed/temperature first flows toward the thick portion molding space 43a along a fluid space between the gate 47 and the convex portion 35 (fluid space above the convex portion 35). Subsequently, the resin flows into a fluid space under the convex portion 35, and flows along the fluid space in a tracing manner. Moreover, the thermoplastic resins which have flown along the respective fluid spaces simultaneously reach the thick portion molding space 43a. The height/length of the convex portion 35 is preferably adjusted in such a manner that the thermoplastic resins which have flown through a plurality of fluid spaces in this manner can simultaneously reach the thick portion molding space 43a.

It is to be noted that the convex portion 35 may be formed on the inner surface of the large-diameter side end portion 3 facing at least the thin portion molding space 43b. The convex portion 35 may be optionally disposed in the present invention, and the number of convex portions may also be appropriately designed/changed.

EXAMPLE 2

Figure 13:
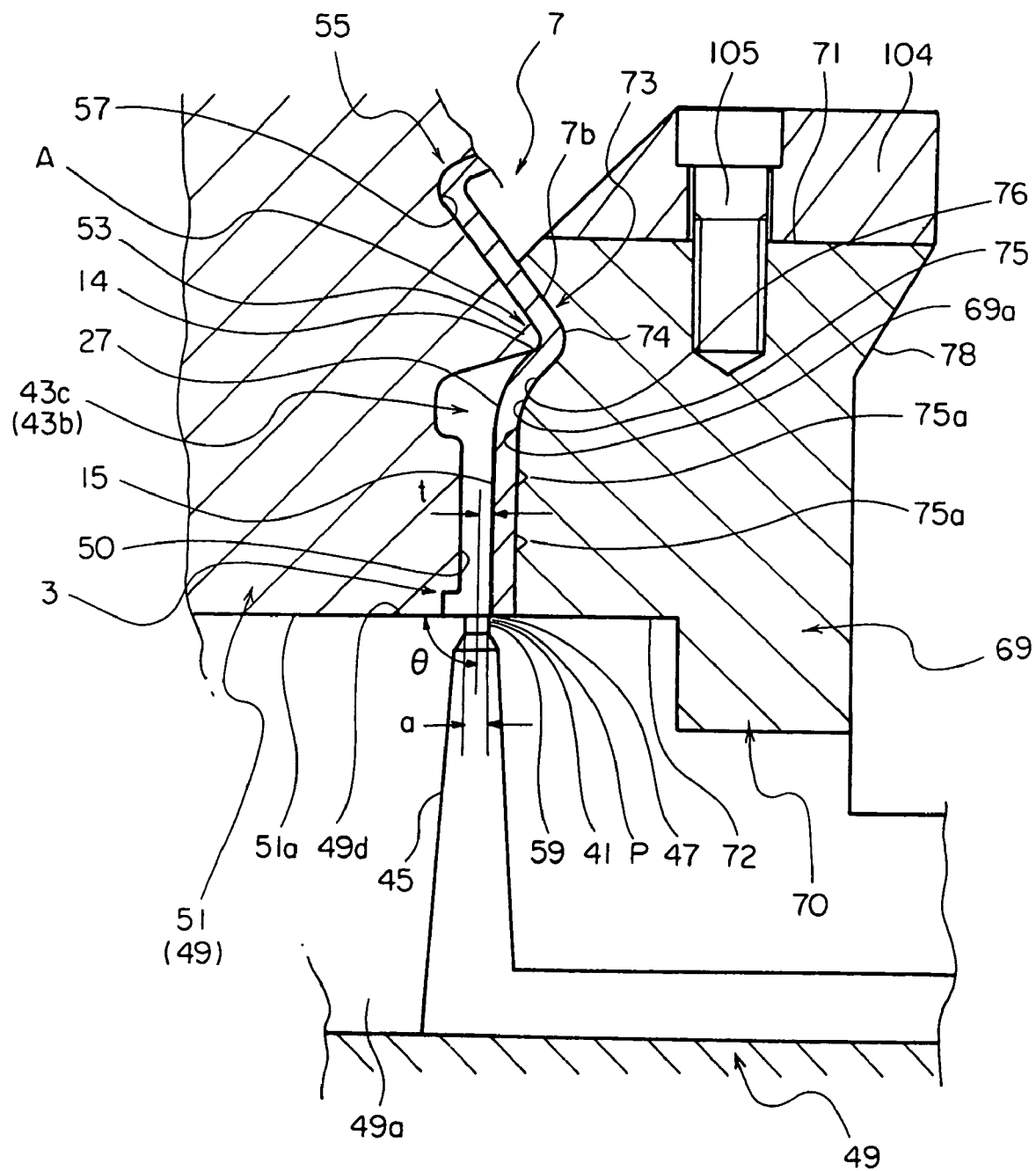
FIG. 13 is a partially enlarged sectional view of an apparatus in Example 2.
Figure 14:
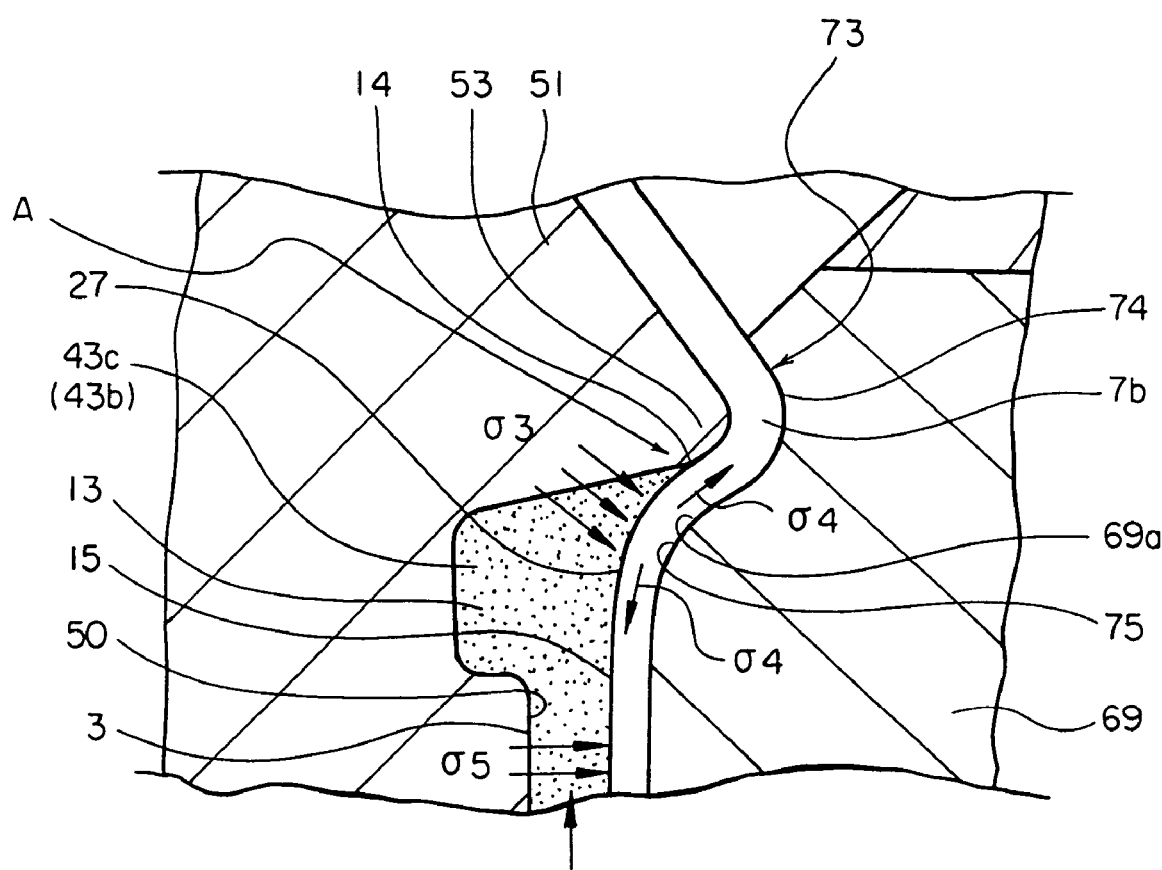
FIG. 14 is an enlarged sectional view showing that a molten material is injected into the secondary molding space in Example 2.

FIGS. 13 and 14 show another example of the secondary molding step. It is to be noted that in the present example, as described later, only the formed place of the secondary molding space 43c, the injection position of the molten material and the like differ from those of the secondary molding space 43 of Example 1. The description of Example 1 applies to constitutions and functions/effects other than those described hereinafter, and the description is omitted.

"Primary Molding Step"

The basic constitution, molding method and the like of the primary molded member of the present example are similar to those of Example 1, but the large-diameter side end portion 3 is formed in a cylindrical shape having a straight sectional thickness. It is to be noted that unlike the present example, to enhance the adhesion to the secondary molded member, the outer peripheral surface 15 of the large-diameter side end portion 3 may also be formed in a coarse surface (concave/convex surface). It is to be noted that at least one or more of the convex and concave portions are simultaneously formed on the outer peripheral surface 15 of the large-diameter side end portion of the bellows portion 7 which is the primary molded member at the primary molding time in the same manner as in the large-diameter side end portion inner peripheral surface of Example 1. Then, the fusion-bonding to the portion having different thicknesses which is the secondary molded member 13 is strengthened in the same manner as in Example 1. When the convex portions are disposed, the function/effect of the convex portion operating also as the weir is produced in the same manner as in Example 1, and detailed description is omitted.

"Secondary Molding Step"

In the present example, a secondary molding space 43c (43a, 43b) for the secondary molding is formed between the outer peripheral surface 15 of the large-diameter side end portion 3 of the primary molded member disposed between the divided mold 51 and the core mold 69, and the inner peripheral surface of the divided mold 51 (mold inner peripheral surface 50), and the molten material is injected into the secondary molding space 43c to mold the large-diameter side end portion including the portion having different thicknesses.

It is to be noted that in the core mold 69 of the present example, in an outer peripheral portion between the large-diameter side end portion lower end surface 72 and the concave peripheral groove 74 (85), two sealing lip molding concave portions 75a, 75a for transferring/molding the sealing lips 21 (21a, 21b) disposed on the inner peripheral surface of the large-diameter side end portion 3 of the boot 1 in a secondary molding stage are disposed in an axial direction.

First, an example of the secondary molding step in the present example will be described. For example, first the inner peripheral surface of the large-diameter side end portion 3 of the primary molded member is fitted into the outer peripheral surface of the core mold 69 disposed beforehand on the fixed board 49a side of the mold 49 to attach the primary molded member to the core mold 69.

Moreover, next the primary molded member including the large-diameter side end portion 3 fitted into the outer peripheral surface of the core mold 69 as described above is disposed/held in the mold 49, when the divided molds 51 are clamped.

When the divided molds 51 are clamped in this manner, as shown in FIG. 14, a protrusion 53 of the inner surface of the divided mold 51 fits into the whole outer surface of the small-diameter portion 7b just in the vicinity of the large-diameter side end portion 3 of the bellows portion 7. The concave peripheral groove 74 (85) formed in the concave shape in the outer peripheral surface of the tip of the core mold 69 fits into the whole inner surface of the small-diameter portion 7b, and the small-diameter portion 7b is held between the protrusion 53 of the divided mold 51 and the concave peripheral groove 74 (85) of the core mold 69.

Through this step, as shown in FIG. 14, the sealed portion A is formed in the held portion of the small-diameter portion 7b, and the secondary molding space 43c for molding the secondary molded member 13 constituted of the thick portions 17 and thin portions 19 on the outer peripheral surface 15 of the large-diameter side end portion 3 of the primary molded member is formed between the outer peripheral surface 15 of the large-diameter side end portion 3 of the primary molded member and the inner peripheral surface (mold inner peripheral surface 50) of the divided mold 51.

Moreover, the steps of the present example include the following steps 1 to 3.

(Step 1)

As shown in FIG. 14, when the molten material is injected into the secondary molding space 43c, the injection pressure of the injected molten material is applied to the tapered surface 27 extending toward the large-diameter side end portion 3 from the small-diameter portion 7b just in the vicinity of the large-diameter side end portion 3 in the primary molded member held between the inner peripheral surface of the protrusion 53 of the divided mold 51 and the concave peripheral groove 74 (85) of the outer peripheral surface of the tip of the core mold 69.

(Step 2)

The tapered surface 27 compressed by the injection pressure of the molten material is expanded toward the small-diameter portion 7b.

(Step 3)

When the tapered surface 27 is expanded, the small-diameter portion 7b held between the inner peripheral surface of the protrusion 53 of the divided mold 51 and the outer peripheral surface of the concave peripheral groove 74 (85) of the core mold 69 is pressure-welded to the inner peripheral surface of the protrusion 53 of the divided mold 51.

On the other hand, the cylindrical portion (straight portion) of the large-diameter side end portion to which the injection pressure (stress σ5 shown in FIG. 14) is applied is heated, softened, and pressure-welded to the outer peripheral surface of the core mold 69. A part of the material enters the sealing lip forming concave portions 75a, 75a of the core mold outer peripheral surface to transfer two annular sealing lips 21 (21a, 21b) disposed in the axial direction onto the inner periphery of the large-diameter side end portion.

As described above, the steps for molding the secondary molded member 13 portion include Steps 1 to 3. Therefore, when the secondary molding material is injected into the secondary molding space 43c, the secondary molding material does not easily leak from the sealed portion A between the outer surface of the small-diameter portion 7b just in the vicinity of the large-diameter side end portion 3 in the primary molded member and the inner peripheral surface of the protrusion 53 of the divided mold 51.

That is, as shown in FIG. 14, a flow-direction front end portion of the molten resin as the secondary molding material which has flown into the secondary molding space 43c reaches the tapered surface 27 extending to the large-diameter side end portion 3 from the small-diameter portion 7b just in the vicinity of the large-diameter side end portion 3 in the bellows portion 7.

Moreover, the molten resin functions to pressurize the tapered surface 27 by the injection pressure, and it is recognized that a stress σ3 shown in FIG. 14 is accordingly generated (Step 1 described above).

In this case, since a surface portion 69a of the core mold 69 exists on the inner surface side of the tapered surface 27, the material of the pressed primary molded member is pressurized, and tries to expand to the outside in a direction intersecting with the stress σ3, that is, along the tapered surface 27.

It is recognized that stresses σ4 shown in FIG. 14 are accordingly generated (Step 2 described above).

However, in directions in which the stresses σ4 are applied, an end surface 49d of the fixed board 49a and the protrusion 53 of the inner surface of the divided mold 51 exist. Therefore, the primary molding material existing between both portions 49d, 53 is in a so-called stretching state, and is considered to press both portions 49d, 53.

Therefore, an adhesion between the outer surface of the small-diameter portion 7b of the bellows portion 7 and the protrusion 53 of the inner surface of the divided mold 51 is enhanced. It is considered that a so-called self-sealing effect is produced against leakage of the secondary molding material between the outer surface of the small-diameter portion 7b and the protrusion 53 of the inner surface of the divided mold 51 (Step 3 described above).

Moreover, when conditions of injection of the thermoplastic resin into the secondary molding space 43c are set as follows, the primary molded member is more firmly fusion-bonded to the secondary molded member.

That is, as shown in FIG. 13, a direction θ of the injection gate 47 is set under conditions of $0° \leq θ \leq 90°$ with respect to the outer peripheral surface 15 of the large-diameter side end portion 3. Moreover, assuming that a distance between the outer peripheral surface 15 of the large-diameter side end portion 3 and the injection gate 47 is t and that a diametric direction distance of the injection-side end portion 41 of the secondary molding space 43c is a, the position conditions of the injection gate 47 are set to $0 \leq t \leq 2a/3$.

Accordingly, the thermoplastic resin is injected at the high temperature to sliding-contact the outer peripheral surface 15 of the large-diameter side end portion 3 at the high speed, and is charged into the secondary molding space 43c.

At this time, since the thermoplastic resin injected at the high temperature flows into the space in sliding contact with the outer peripheral surface 15 of the large-diameter side end portion 3, impurities of the material for the primary molding, attached to the front surface of the outer peripheral surface 15, are washed away. Moreover, the heat of the thermoplastic resin which has flown at the high temperature/speed is transferred to the outer peripheral surface 15 to melt the outer peripheral surface 15.

Therefore, the injected thermoplastic resin is firmly fusion-bonded to the surface of the primary molding material molten by the heat of the thermoplastic resin, and the secondary molded member 13 is molded integrally between the outer peripheral surface 15 of the large-diameter side end portion 3 and the inner peripheral surface of the divided mold 51 (mold inner peripheral surface 50).

"Modification"

Figure 15:
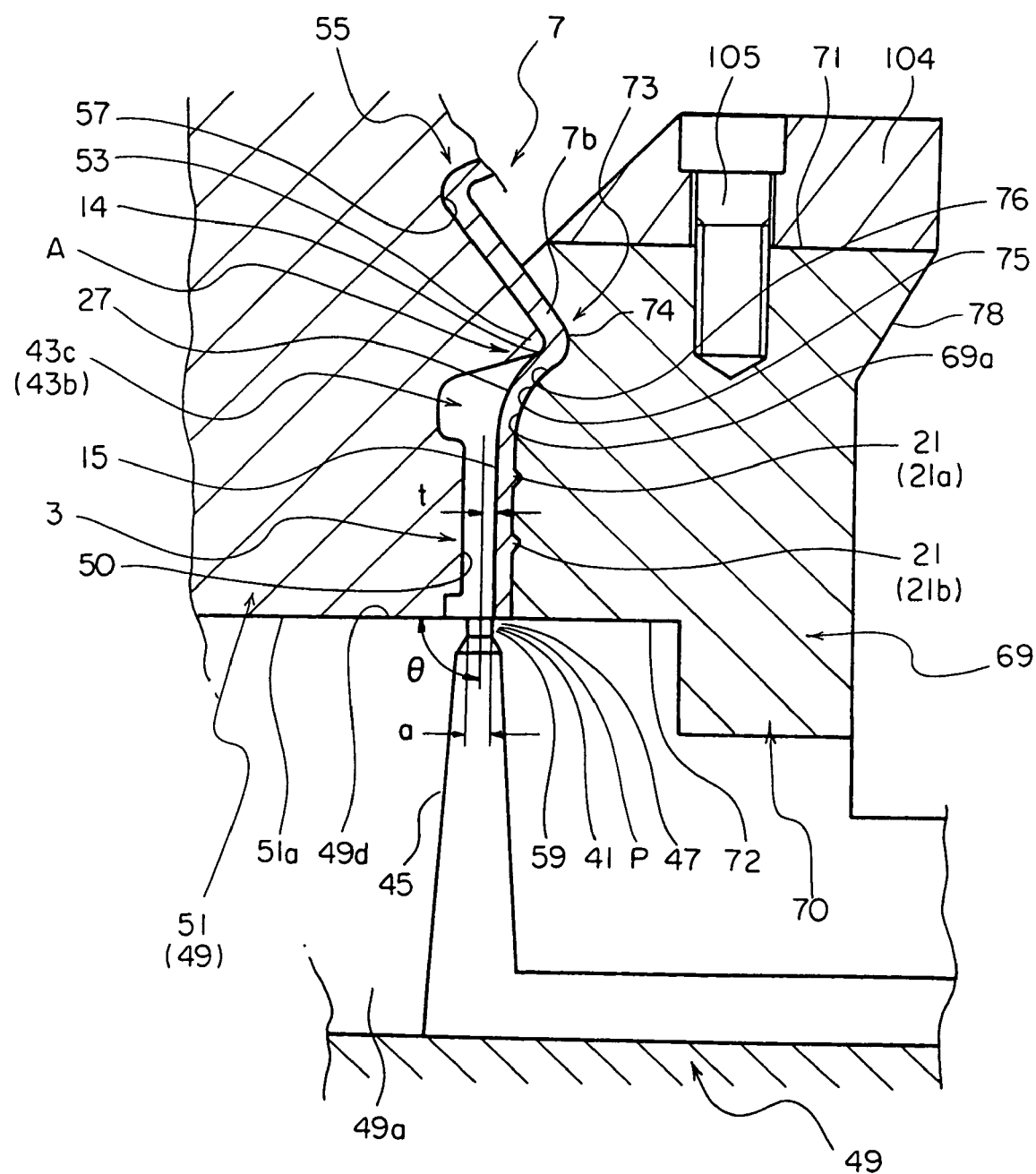
FIG. 15 is a partially enlarged sectional view showing a modification of the apparatus of Example 2.

A modification of Example 2 shown in FIG. 13 is shown in FIG. 15. In the present modification, at the molding time of the primary molded member, the inner peripheral surface of the large-diameter side end portion 3 is molded beforehand in a shape matching the outer peripheral portion of the core mold 69, and the large-diameter side end portion including the portion having different thicknesses is molded by the steps of Example 2.

Since the other constitutions and functions/effects are similar to those of Example 2 described with reference to FIGS. 13, 14, the detailed description is omitted.

It is to be noted that the gate 47 is disposed in the thick portion molding space 43a so that the thermoplastic resin may be injected only from the thick portion molding space 43a or a plurality of places including the thick portion molding space 43a. However, from the standpoints of prevention of occurrence of the air defect and welding defect, the thin portion molding space 43b is preferably provided with the gate 47 as in the present example.

EXAMPLE 3

Figure 16:
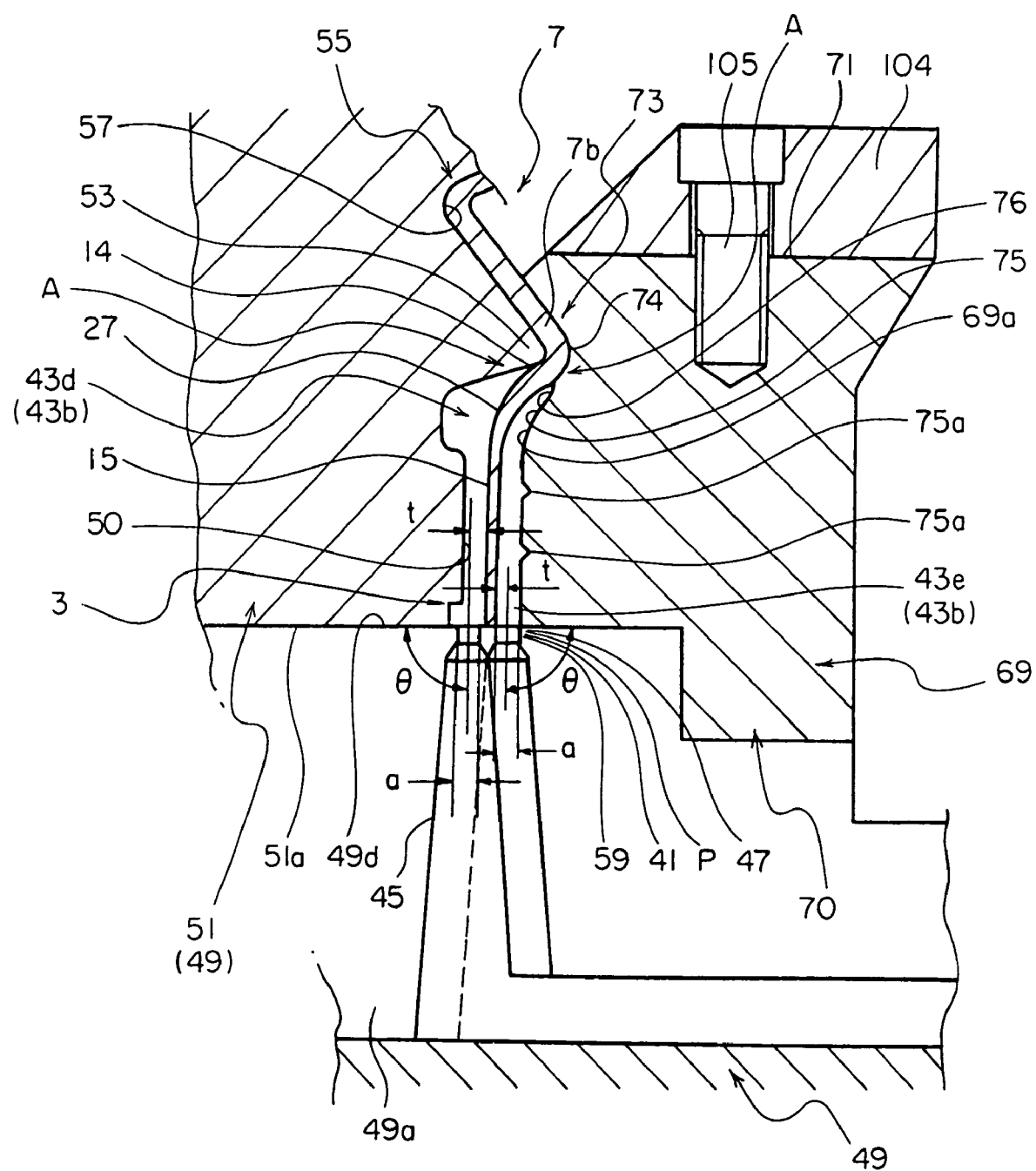
FIG. 16 is a partially enlarged sectional view showing the apparatus in Example 3.
Figure 17:
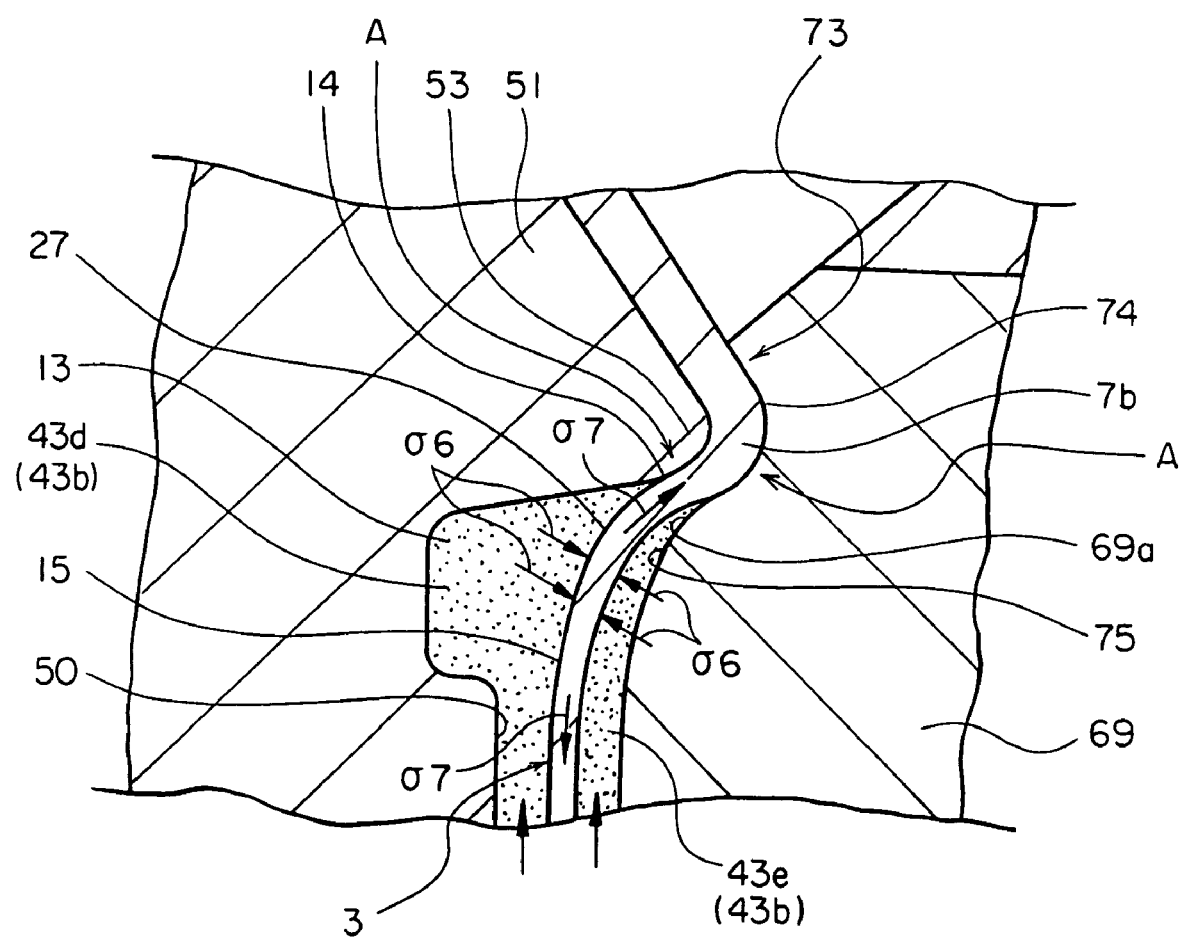
FIG. 17 is an enlarged sectional view showing that the molten material is injected into the secondary molding space in Example 3.

FIGS. 16 and 17 show another example of the secondary molding step. It is to be noted that in the present example, as described later, only the formed places of the secondary molding spaces 43d, 43e, the injection position of the molten material and the like differ. The descriptions of Examples 1 and 2 apply to constitutions and functions/effects other than those described hereinafter, and description is omitted. Since the primary molding step is similar to that of Example 2, the secondary molding step will be described.

"Secondary Molding Step"

In the present example, secondary molding spaces 43d, 43e are formed between the core mold outer peripheral surface and the mold inner peripheral surface 50 via the inner/outer peripheral surface of the large-diameter side end portion 3, and the molten material is injected into the secondary molding spaces 43d, 43e to integrally mold the portion having different thicknesses which is the secondary molded member. The constitutions of the mold 49 and core mold 69 and the like are similar to those of Example 2.

That is, in the present example, the large-diameter side end portion 3 of the primary molded member is positioned apart from the inner peripheral surface of the divided mold 51 (mold inner peripheral surface 50) and the outer peripheral surface of the core mold 69 between the inner peripheral surface of the divided mold 51 (mold inner peripheral surface 50) and the outer peripheral surface of the core mold 69.

Moreover, the injection gates 47 are positioned facing the secondary molding space 43d formed between the divided mold inner peripheral surface (mold inner peripheral surface 50) and the large-diameter side end portion outer peripheral surface 15, and the secondary molding space 43e formed between the core mold outer peripheral surface and the large-diameter side end portion inner peripheral surface. It is to be noted that the thin portion molding space 43b is shown as an example, but the thick portion molding space 43a is also similar, and therefore the description is omitted.

In the injection conditions by the injection gates 47 of the present example, the description of Example 2 applies to the injection gate disposed facing the secondary molding space 43d, and that of Example 1 applies to the injection gate disposed facing the secondary molding space 43e. It is to be noted that injection amount/pressure of the molten material injected into the secondary molding spaces 43d, 43e may be appropriately designed/changed.

Moreover, the steps of the present example include the following steps 1 to 3.

(Step 1)

As shown in FIG. 17, when the molten material is injected into the secondary molding spaces 43d, 43e, the injection pressure of the injected molten material is applied to the tapered surface 27 extending toward the large-diameter side end portion 3 from the small-diameter portion 7b just in the vicinity of the large-diameter side end portion 3 in the primary molded member held between the inner peripheral surface of the protrusion 53 of the divided mold 51 and the concave peripheral groove 74 (85) of the outer peripheral surface of the tip of the core mold 69 from the outer/inner surface.

(Step 2)

The tapered surface 27 compressed by the injection pressure of the molten material is expanded toward the small-diameter portion 7b.

(Step 3)

When the tapered surface 27 is expanded, the small-diameter portion 7b held between the inner peripheral surface of the protrusion 53 of the mold 49 and the outer surface of the concave peripheral groove 74 (85) of the core mold 69 is pressure-welded to the inner peripheral surface of the protrusion 53 of the mold 49.

As described above, the steps for molding the secondary molded member 13 portion include Steps 1 to 3. Therefore, when the secondary molding material is injected into the secondary molding spaces 43d, 43e, the secondary molding material does not easily leak from the sealed portions A between the outer surface of the small-diameter portion 7b just in the vicinity of the large-diameter side end portion 3 in the primary molded member and the inner peripheral surface of the protrusion 53 of the mold 49 and between the inner surface of the small-diameter portion 7b and the concave peripheral groove 74 (85) of the outer periphery in the vicinity of the tip of the core mold 69.

As shown in FIG. 17, flow-direction front end portions of the molten resins as the secondary molding materials which have flown into the secondary molding spaces 43d, 43e reach the tapered surface 27 extending to the large-diameter side end portion 3 from the small-diameter portion 7b just in the vicinity of the large-diameter side end portion 3 in the bellows portion 7 from the outer/inner surfaces.

Moreover, the molten resin functions to pressurize the tapered surface 27 by the injection pressure from the outer/inner surface, and it is recognized that a stress $\sigma 6$ shown in FIG. 12 is accordingly generated (Step 1 described above).

In this case, since the tapered surface 27 is pressurized by stresses $\sigma 6$, $\sigma 6$ from the outer/inner surface, the material of the pressed primary molded member is pressurized, and tries to expand to the outside in a direction intersecting with the stress $\sigma 6$, that is, along the tapered surface 27.

It is recognized that a stress $\sigma 7$ shown in FIG. 17 is accordingly generated (Step 2 described above).

However, in the direction in which the stress $\sigma 7$ is applied, an end surface 49d of the fixed board 49a, the protrusion 53 of the inner surface of the divided mold 51, and the concave peripheral groove 74 (85) of the outer periphery just in the vicinity of the tip of the core mold 69 exist. Therefore, the primary molding material existing between both portions 49d and 53 or 74 (85) is in a so-called stretching state, and is considered to press both portions 49d and 53, or 74 (85).

Therefore, an adhesion between the outer surface of the small-diameter portion 7b of the bellows portion 7 and the protrusion 53 of the inner surface of the divided mold 51, and that between the outer surface of the small-diameter portion 7b and the concave peripheral groove 74 (85) of the outer periphery just in the vicinity of the tip of the core mold 69 are enhanced. It is considered that a so-called self-sealing effect is produced against leakage of the secondary molding material between the outer surface of the small-diameter portion 7b and the protrusion 53 of the inner surface of the divided mold 51 and between the outer surface of the small-diameter portion 7b and the concave peripheral groove 74 (85) of the outer periphery just in the vicinity of the tip of the core mold 69 (Step 3 described above).

It is to be noted that the gate 47 is disposed in the thick portion molding space 43a so that the thermoplastic resin may be injected only from the thick portion molding space 43a or a plurality of places including the thick portion molding space 43a. However, from the standpoints of prevention of occurrence of the air defect and welding defect, the thin portion molding space 43b is preferably provided with the gate 47 as in the present example.

What is claimed is:

1. A method of manufacturing a boot for a constant-velocity universal joint, including a plurality of large thickness portions disposed approximately in equal distance in a peripheral direction of an inner surface of a large diameter side end portion and a plurality of small thickness portions disposed in-between the large thickness portions and the thickness thereof in the peripheral direction is thinner than that of the large thickness portions, the method comprising the steps of:

preparing a primary molded member, including a bellow portion with approximately conical shaped and hollow inside, a small diameter side end portion provided to one side of the bellow portion and the large diameter side end portion provided to another side of the bellow portion; and a secondary molding step of welding the large thickness portions and the small thickness portions integrally to the inner surface of the large diameter side end portion of the primary molded member;

wherein the secondary molding step has:

a first step of forming a secondary molding space between an outer periphery surface of a core mold and the inner periphery surface of the large diameter side end portion by holding a small diameter portion placed just in vicinity of the large diameter side end portion of the primary molded member with the core mold disposed in an inner periphery side of the large diameter side portion and a metal mold disposed in an outer periphery side of the large diameter side end portion; the secondary molding space having a plurality of thick portion molding spaces for molding the large thickness portions and a plurality of thin portion molding spaces for molding the small thickness portions;

a second step of filling a molten material into the secondary molding space by injecting the molten material to the secondary molding space from a plurality of molten material injection points;

a third step of integrally molding the large thickness portions and the small thickness portions to the inner surface of the large diameter side end portion as the molten material filled in the secondary molding space solidifies; and a fourth step of separating the core mold and the large diameter side end portion by having a plurality of parts of the core mold, which are disposed in the thick portion molding spaces and abut on end portions of the large diameter side end portions, move to a central direction of the core mold, wherein the thick portion molding spaces and the thin portion molding spaces communicate with each other along a peripheral direction of the large diameter side portion and molten material injection points are provided according to each of the thin portion molding spaces; and wherein the second step has the steps of:

setting a direction $\theta$ of the injection gate to $0° \leq \theta \leq 90°$ with respect to the inner peripheral surface of the large-diameter side end portion; and setting a position of the injection gate to $0 \leq t \leq 2a/3$ when a distance between the inner surface of the large-diameter side end portion and an injection gate center is t and that a diametric direction distance of an injection-side end portion of the secondary molding space is "a" and injecting the molten material so as to bring the molten material into sliding contact with the inner peripheral surface of the large-diameter side end portion.

2. The method of manufacturing the boot for the constant-velocity universal joint according to claim 1; wherein the molten material is injected into the secondary molding space from an end surface side of the secondary molding space.

3. The method of manufacturing the boot for the constant-velocity universal joint according to claim 1; wherein the thick portion molding spaces and the thin portion molding spaces communicate with each other along a peripheral direction of the large diameter side portion and molten material injection points are provided according to each of the thin portion molding spaces, the method further comprising the steps of:

inserting/disposing one or two pins at an interval in each of the thick portion molding spaces in the secondary molding space; and forming one or two holes in each of the large thickness portions.

4. A method of manufacturing a boot for a constant-velocity universal joint, including a plurality of large thickness portions disposed approximately in equal distance in a peripheral direction of an outer surface of a large diameter side end portion and a plurality of small thickness portions disposed in-between the large thickness portions and the thickness thereof in the peripheral direction is thinner than that of the large thickness portions, the method comprising the steps of:

preparing a primary molded member, including a bellow portion with approximately conical shaped and hollow inside, a small diameter side end portion provided to one side of the bellow portion and the large diameter side end portion provided to another side of the bellow portion and the large diameter side end portion is formed so that the shape thereof is approximately similar to an outer surface of an outer casing of the constant-velocity universal joint; and a secondary molding step of welding the large thickness portions and the small thickness portions integrally to an outer surface of the large diameter side of the primary molded member;

wherein the second molding step has:

a first step of forming a secondary molding space between an inner periphery surface of a metal mold and the outer periphery surface of the large diameter side end portion by holding a small diameter portion placed just in vicinity of the large diameter side end portion of the primary molded member with a core mold disposed in an inner periphery side of the large diameter side portion and the metal mold disposed in an outer periphery side of the large diameter side end portion; the secondary molding space having a plurality of thick portion molding spaces for molding the large thickness portions and a plurality of thin portion molding spaces for molding the small thickness portions;

a second step of filling a molten material into the secondary molding space by injecting the molten material to the secondary molding space from a plurality of molten material injection points;

a third step of integrally molding the large thickness portions and the small thickness portions to the outer surface of the large diameter side end portion as the molten material filled in the secondary molding space solidifies; and a fourth step of separating the core mold and the large diameter side end portion by having a plurality of parts of the core mold, which are disposed in the thick portion molding spaces and abut on end portions of the large diameter side end portions, move to a central direction of the core mold, wherein the thick portion molding spaces and the thin portion molding spaces communicate with each other along a peripheral direction of the large diameter side portion and molten material injection points are provided according to each of the thin portion molding spaces; and the second step has the steps of:

setting a direction $\theta$ of the injection gate to $0° \leq \theta \leq 90°$ with respect to the outer peripheral surface of the large-diameter side end portion; and setting a position of the injection gate to 0≦0≦t2a/3 when a distance between the outer surface of the large-diameter side end portion and an injection gate center is t and that a diametric direction distance of an injection-side end portion of the secondary molding space is "a" and injecting the molten material so as to bring the molten material into sliding contact with the outer peripheral surface of the large-diameter side end portion.

5. The method of manufacturing the boot for the constant-velocity universal joint according to claim 4;
   wherein the molten material is injected into the secondary molding space from an end surface side of the secondary molding space.

6. The method of manufacturing the boot for the constant-velocity universal joint according to claim 4;
   wherein the thick portion molding spaces and the thin portion molding spaces communicate with each other along a peripheral direction of the large diameter side portion and molten material injection points are provided according to each of the thin portion molding spaces, the method further comprising the steps of:

inserting/disposing one or two pins at an interval in each of the thick portion molding spaces in the secondary molding space; and forming one or two holes in each of the large thickness portions.

* * * * *